(12) United States Patent
Hijazi et al.

(10) Patent No.: US 10,937,443 B2
(45) Date of Patent: Mar. 2, 2021

(54) DATA DRIVEN RADIO ENHANCEMENT

(71) Applicant: Babblelabs, Inc., Wilmington, DE (US)

(72) Inventors: Samer Hijazi, San Jose, CA (US); Kamil Krzysztof Wojcicki, San Jose, CA (US); Dror Maydan, Palo Alto, CA (US); Christopher Rowen, Santa Cruz, CA (US)

(73) Assignee: BabbleLabs LLC, Wilmington, DE (US)

( * ) Notice: Subject to any disclaimer, the term of this patent is extended or adjusted under 35 U.S.C. 154(b) by 115 days.

(21) Appl. No.: 16/121,052

(22) Filed: Sep. 4, 2018

(65) Prior Publication Data

US 2020/0075033 A1   Mar. 5, 2020

(51) Int. Cl.
| | | |
|---|---|---|
| *G10L 21/0232* | (2013.01) | |
| *G10L 21/0364* | (2013.01) | |
| *H04L 1/08* | (2006.01) | |
| *H04L 1/00* | (2006.01) | |
| *G06N 3/08* | (2006.01) | |
| *G10L 21/04* | (2013.01) | |
| *G06N 3/04* | (2006.01) | |
| *G10L 25/30* | (2013.01) | |

(52) U.S. Cl.
CPC .......... *G10L 21/0364* (2013.01); *G06N 3/04* (2013.01); *G06N 3/084* (2013.01); *G06N 3/086* (2013.01); *G10L 21/04* (2013.01); *G10L 25/30* (2013.01); *H04L 1/0045* (2013.01); *H04L 1/08* (2013.01)

(58) Field of Classification Search
CPC ............. G10L 21/0232; G10L 21/0264; G10L 13/027; G10L 21/0205; G06F 17/21
See application file for complete search history.

(56) References Cited

U.S. PATENT DOCUMENTS

| | | | | |
|---|---|---|---|---|
| 4,675,863 | A * | 6/1987 | Paneth .................. | H04W 88/08 370/334 |
| 2005/0114128 | A1* | 5/2005 | Hetherington ...... | G10L 21/0208 704/233 |
| 2005/0159179 | A1* | 7/2005 | Sainton ................... | H04W 4/24 455/552.1 |
| 2016/0182171 | A1* | 6/2016 | Milbar .................. | H04H 20/72 375/259 |
| 2016/0293167 | A1 | 10/2016 | Chen et al. | |
| 2018/0233127 | A1* | 8/2018 | Visser ..................... | G10L 21/00 |

(Continued)

OTHER PUBLICATIONS

Sensor Empower Voice Interface, Digital Engineering, Apr. 13, 2018.

(Continued)

*Primary Examiner* — Jakieda R Jackson
(74) *Attorney, Agent, or Firm* — Lee & Hayes, P.C.

(57) ABSTRACT

Systems and methods are disclosed for data driven radio enhancement. For example, methods may include demodulating a radio signal to obtain a demodulated audio signal; determining a window of audio samples based on the demodulated audio signal; applying an audio enhancement network to the window of audio samples to obtain an enhanced audio segment, in which the audio enhancement network includes a machine learning network that has been trained using demodulated audio signals derived from radio signals; and storing, playing, or transmitting an enhanced audio signal based on the enhanced audio segment.

22 Claims, 13 Drawing Sheets

(56) References Cited

U.S. PATENT DOCUMENTS

2019/0121911 A1* 4/2019 Delaney .............. G06F 16/9535
2020/0066295 A1* 2/2020 Karimian-Azari ...........................
G10L 21/0264

OTHER PUBLICATIONS

Xu et al, A Regression Approach to Speech Enhancement Based on Deep Neural Networks, IEEE/ACM Transactions on Audio, Speech, and Language Processing, vol. 32, No. 1, Jan. 2015.

Elbaz et al, End to End Deep Neural Networks Radio Receiver for Speech Signals, Computer Science Department, Technion-Israel Institute of Technology.

Elbaz et al, End to End Deep Neural Network Frequesncy Demodulation of Speech Signals, Computer Science Department, Technion-Israel Institute of Technology.

Guenther et al, A Neural Model of Speech Production, Proceedings of the 6th International Seminar on Speech Production, Sydney, Dec. 7-10, 2003, p. 1-7.

Nossair et al, A Neural Network Clustering Technique for Text-Independent Speaker Identification, Departmrnt of Electrical and Computer Engineering, Old Dominion University, Norfolk, VA 23529.

Farrell et al, Speaker Recognition Using Neural Tree Networks, CAIP Center, Rutgers University Core Building, Frelinghuysen Road, Piscataway, NJ 08855, p. 1035-1042.

Goehring et al, Speech Enhancement Based on Neural Networks Improves Speech Intellgibility in Noise for Cochlear Implant Users, Hearing Research 344 (2017) 183-194.

Kumar et al, Speech Enhancement in Multiple-Noise Conditions Using Deep Neural Networks, Carnegie Mellon University, Pittsburgh, PA 15217, Microsoft Reseach, Redmond, WA USA—98052.

Rehr et al, Normalized Features for Improving The Generalization of DNN Based Speech Enhancement, p. 1-10.

Takahashi et al, Deep Convolution Neural Networks and Data Augmentation for Acoustic Event Detection, Sony Corporation, Japan, Dept. Information Technology and Electrical Engineering, ETH Zurich, Switzerland.

Zhao et al, Deep Neural Networks for Cochannel Spearker Identification, ICASSP 2015, p. 4824-4828.

\* cited by examiner

DATA DRIVEN RADIO ENHANCEMENT

TECHNICAL FIELD

This disclosure relates to data driven radio enhancement.

BACKGROUND

Since the advent of the early telecommunications systems in the early nineteenth century, erratically received messages were and continue to be a problem associated with this technology. The main source of this problem is the noise that gets added and modulated with the transmitted signal. Over the years many steps have been taken by telecommunications engineers to mitigate and limit the impact of these errors. Some of these steps can be classified into two categories: modulation schemes that are inherently more tolerant to channel noise and impairments; and adding redundancy in the transmitted signal that would enhance the receiver's chance to rectify an error. This controlled redundancy insertion in known as forward error correction (FEC) and is one of the main reasons the telecommunications technology have migrated from analog communication systems to digital communication systems. The FEC technology is applicable in context of a digital communication system.

SUMMARY

Disclosed herein are implementations of data driven radio enhancement.

In a first aspect, the subject matter described in this specification can be embodied in systems that include a processing apparatus that is configured to access a demodulated audio signal that is based on a demodulated radio signal; determine a window of audio samples based on the demodulated audio signal; apply an audio enhancement network to the window of audio samples to obtain an enhanced audio segment, in which the audio enhancement network includes a machine learning network that has been trained using demodulated audio signals derived from radio signals; and store, play, or transmit an enhanced audio signal based on the enhanced audio segment.

In a second aspect, the subject matter described in this specification can be embodied in methods that include demodulating a radio signal to obtain a demodulated audio signal; determining a window of audio samples based on the demodulated audio signal; applying an audio enhancement network to the window of audio samples to obtain an enhanced audio segment, in which the audio enhancement network includes a machine learning network that has been trained using demodulated audio signals derived from radio signals; and storing, playing, or transmitting an enhanced audio signal based on the enhanced audio segment.

In a third aspect, the subject matter described in this specification can be embodied in a non-transitory computer-readable storage medium. The non-transitory computer-readable storage medium may include executable instructions that, when executed by a processor, facilitate performance of operations, including accessing a demodulated audio signal that is based on a demodulated radio signal; determining a window of audio samples based on the demodulated audio signal; applying an audio enhancement network to the window of audio samples to obtain an enhanced audio segment, in which the audio enhancement network includes a machine learning network that has been trained using demodulated audio signals derived from radio signals; and storing, playing, or transmitting an enhanced audio signal based on the enhanced audio segment.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
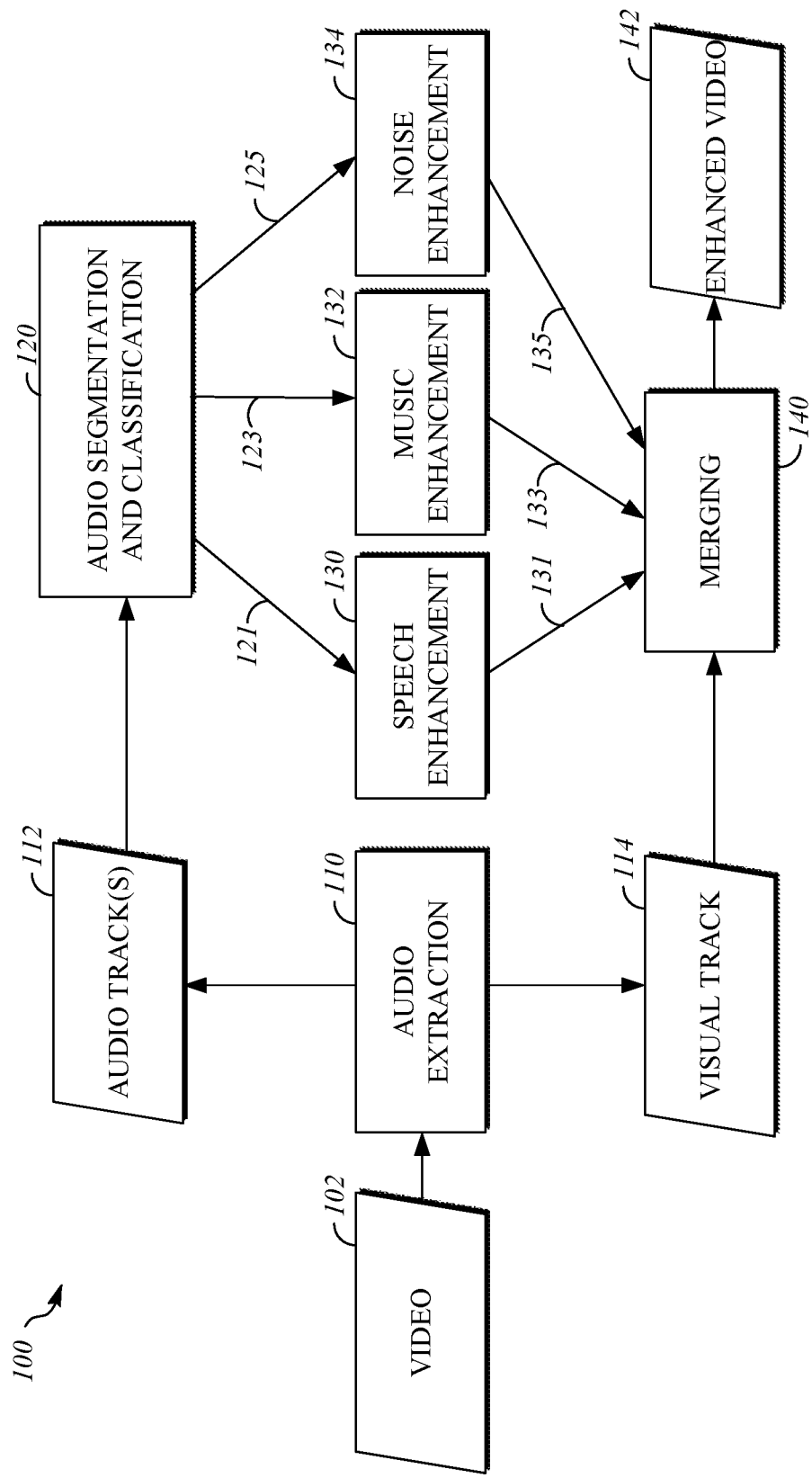
FIG. 1 is a block diagram of an example of a system for data driven audio enhancement.

This document includes disclosure of systems and methods for data driven radio enhancement. Audio signals are modulated and broadcast as radio signals (e.g., AM or FM radio signals), which are received and demodulated using radio receivers. The demodulated audio signals from a radio receiver may be played for a user using a speaker. The communication channel that includes the radio modulation, radio transmission through the medium, and radio demodulation introduces noise and other distortions to audio signals that may be characteristic of this communication channel and may exhibit properties specific to a particular radio transmitter, a particular radio receiver, and/or particular location.

Data driven algorithms such as Neural Networks may be used to counter the errors introduced in analog reception by relying on the redundancy that exist natively in the analog audio source signals. An advantage of this approach is the fact that it may be implemented without changes in the existing receiver architecture. For example, in the context of analog radio, an audio enhancement system described herein may be installed and used between an analog radio receiver and a speaker.

An audio enhancement network for demodulated radio signals may effectively serve as a type of error correction system for analog audio signals. For example, the audio enhancement network for demodulated radio signals may be trained by collecting data from the received analog radio signals. To facilitate training of data driven, machine learning networks (e.g., neural networks) that operate on digital signals, the training data gathered the received analog radio signal and from a corresponding analog source audio signal or streamed audio signal may be sampled and quantized. This may be a challenge as these analog signals come from a different source, hence the sampling frequency may not be matched. To solve this problem, the drift in sampling frequency between the two corresponding signals used for training may be estimated and one of the reference signals (e.g., an analog source signal or a streamed audio signal) may be resampled to match the received, demodulated radio signal sampling frequency.

This document includes disclosure of systems and methods for data driven audio enhancement. The disclosed audio enhancement techniques may be employed for a variety of audio signals, such as, for example an audio track of a video. Often video is captured in high noise environments (e.g., at children's birthday celebrations, in backyards, at parties in restaurants and clubs, and in all kinds of events out on the streets and in parks) with low quality recording equipment. Unfortunately, the quality of the audio recordings may make these audio signals difficult to understand or uncomfortable to listen to. Amateur video recording often suffers from microphone distortion, heavy background noise, pronounced wind noise, and reverberation. For example, an automated system is disclosed to significantly improve the audio quality, especially the speech quality, of video recordings, reducing the background noise, improving clarity (e.g., speech clarity), and rendering the audio associated with a video more intelligible.

Benefits of audio quality enhancement, especially speech enhancement, are not limited to amateur video. For example, almost any audio recording (e.g., a video recording that includes an audio track) outside of a studio, is likely to face impairments to sound quality and speech intelligibility. From-the-scene news reports, for example, may still have to contend with significant background noise and other acoustic, electroacoustic, and/or digital impairments.

First the audio may be classified into different time segments, with different dominant audio content (e.g., speech segments, music segments and other segments) such that different audio processing algorithms can be applied to each type of content. Second, content-specific audio processing algorithms employed may be learned processing functions using deep neural networks (DNNs) to learn to a fuller set of transformations to separate a rich mix of different noises and acoustic impairments from the rich mix of sounds to be retained (e.g., retention of speech sounds to improve speech intelligibility).

The disclosed systems may fit flexibly into the current pattern of typical audio (e.g., video) production, storage and consumption. The audio enhancement method can be implemented on-the-fly as part of the original audio recording, as a transformation applied where the audio is stored for sharing (e.g., in a cloud-based video access site, or on-the-fly as part of the video player, when the viewer is listening to the video).

The proposed techniques and systems for data driven audio enhancement may offer advantages over conventional audio processing systems. For example, using a classifier to classify audio by time segment and select an enhancement network trained to enhance particular types of audio signals may improve enhanced audio quality and/or simplify training for the individual audio enhancement networks. For example, application of an environment specific model for enhancement of audio from such environment may provide an advantage given the training and testing conditions are well matched. For example, training of an audio enhancement network may be achieved with less training examples by using data augmentation based on a collection of room acoustic models. Some implementations may provide speaker identification and/or customization for particular users.

As used herein, the term "AV data" refers to a data structure (e.g., a file or a bitstream) that includes visual data (e.g., one or more visual tracks) and audio data (e.g., one or more audio tracks) that are associated with a video. The tracks of an AV data may be synchronized. The tracks of an AV data may be encoded (e.g., using a compression algorithm). Some examples of AV data are a MP4 file or a MOV file.

Implementations are described in detail with reference to the drawings, which are provided as examples to enable those skilled in the art to practice the disclosed technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a block diagram of an example of a system 100 for data driven audio enhancement. The system 100 includes an audio extraction module 110; an audio segmentation and classification module 120; a set of audio enhancement networks including a speech enhancement network 130, a music enhancement network 132, and a noise enhancement network 134; and a merging module 140. The system 100 may extract an audio track 112 from a video 102, classify the different types of audio content (e.g., speech, music, noise and other types) in that track, processes the respective content types (e.g., the speech content) to improve intelligibility, and recombine a visual track 114 with the new audio track to create the enhanced video 142. For example, the system 100 may be implement the process 500 of FIG. 5. For example, the system 100 may be implemented as part of the system 300 of FIG. 3A. For example, the system 100 may be implemented as part of the system 330 of FIG. 3B. For example, the system 100 may be implemented as part of the system 400 of FIG. 4.

The system 100 includes an audio extraction module 110 that accesses audio data included with video 102. For example, in typical video formats such as MP4 and MOV, an encoded visual track 114 and one or more encoded audio tracks are stored together in the same file. The audio extraction module 110 may parse the file structure using standard interfaces, to acquire an audio track 112. The audio track 112 may then be decompressed into a pulse-coded modulation representation, where each audio channel is expressed by a stream or sequence of sampled values representing the magnitude of the waveform at some at regular frequency, where that frequency is the sample rate. If the audio has multiple channels, the channels may be kept separate or may be combined (e.g., averaged) to form a single monaural channel. For example, the system 100 may operate at a single sampling rate, or for a small set of different sample rates. Audio tracks received at a different sampling rate may be resampled into the most appropriate of the sampling rates supported by the audio. An output of the audio extraction module 110 may include one or more decompressed, combined, resampled audio tracks 112, which is ready for segmentation and classification.

The system 100 includes an audio segmentation and classification module 120. For example, classification of the audio content type may be performed by a classifier, including a deep neural network trained for designation of a primary audio type for each segment or window of the one or more audio tracks 112. The classifier may attempt to identify windows of samples of an appropriate duration for useful enhancement. The classification granularity (i.e., window duration) should not be so coarse that significant material at a type boundary is misclassified and therefore not passed through the right type of audio enhancer. Similarly, granularity should not be so fine that very short intervals, especially short intervals of noise within larger speech segments are classified as separate types. In some implementations, the audio segmentation and classification module 120 may use a fixed classification granularity, typically of 1-5 seconds. The windows of samples for classification may overlap or may be disjoint. In some implementations, the audio segmentation and classification module 120 may search for a more precise boundary between content types.

The audio segmentation might also break the audio up into non-temporal segments (e.g., source or spatial segments). For example, a blind source separation algorithm may be applied to segment an audio track into multiple tracks corresponding to respective sources of sound. For example, a beamforming algorithm can be used to break an input audio track into two tracks, representing potentially temporally overlapping signals, each resultant audio track can be processed separately and then the two resultant enhanced audio signals can be combined and/or merged together after classification and enhancement. For example, an audio track with speech coming from one spatial location and music from another can use the speech network on the speech component and the music network on the music.

The classifier of the audio segmentation and classification module 120 may be trained on some number of content types, where the number is determined by a number of distinct enhancement strategies to be applied. We illustrate a typical system here, using three classes: "speech", "music" and "other", but similar systems can accommodate fewer or more categories. For example, the "other" category, may include segments with just noise, silence or other material for which specific enhancement is unavailable or is undesired. Any given segment of audio may include a mix of audio types, for example, speech with added noise, music with added speech or noise with faint background music. The classifier assesses the mix of audio content in each segment to identify a dominant or primary audio type, and one or more secondary audio types. Those combinations of primary and secondary types may be used to select an audio enhancement network (130, 132, or 134) using a policy matrix, like the one shown below in Table 1, for choosing between two available enhancement methods, a speech enhancer ("SE")

TABLE 1

An example of content processing policy matrix

|  |  | Secondary content | | |
|---|---|---|---|---|
|  |  | Speech | Music | Other |
| Primary Content | Speech | SE | SE | SE |
|  | Music | ME | ME | ME |
|  | Other | SE | ME | SE | and a music enhancer ("ME"). An example of one possible policy matrix is shown in Table 1.

More complex policy matrices are possible using additional criteria, such as a pattern of classifications for preceding and following segments, more levels of content detection and more categories. For example, an implementation of the system 100 may want to distinguish between different types of noise—wind noise, speech babble noise, or traffic noise, or among different types of music, to apply different algorithms for correction of background noise or acoustic interference. In some implementations, outputs of multiple speech enhancers tailored towards detected classes may be combined (e.g., using weighted average) in a probabilistic fashion (e.g., based on class probabilities determined by a soft classifier). In some implementations, additional criteria for selecting an audio enhancement network from a set of available audio enhancement networks could also be based on measures of the environment and its acoustics (such as effective signal-to-noise ratio and amount of reverberation) derived from the audio signal being processed or from other signals (e.g., from other sensors). For example, the audio enhancement network could also be selected based on geo-location (e.g., based on a global positioning system (GPS) signal).

The classifier of the audio segmentation and classification module 120 may include trained deep neural network functions that map from the space of windows of audio samples to a classification (e.g. speech or music or noise) of the audio type for that segment. The classification confidence (e.g., a softmax function of the individual class weights) can also be used to bias policy matrix choices by changing the tendency towards false positives or false negatives for a given classification. (For example, in the face of ambiguity of whether a given audio segment is better considered music or speech, the confidence factor can be used in the classification matrix decision to make borderline segments be treated as speech instead of music. The classifier itself may be a multi-layer deep neural network, trained by stochastic steepest descent loss function optimization. The training data set may contain both audio examples with naturally occurring content mixes (e.g. primary speech+secondary music) and reverberation, and audio examples artificially composed from a mix of pure examples (clean speech, clean music, and noise).

Figure 2:
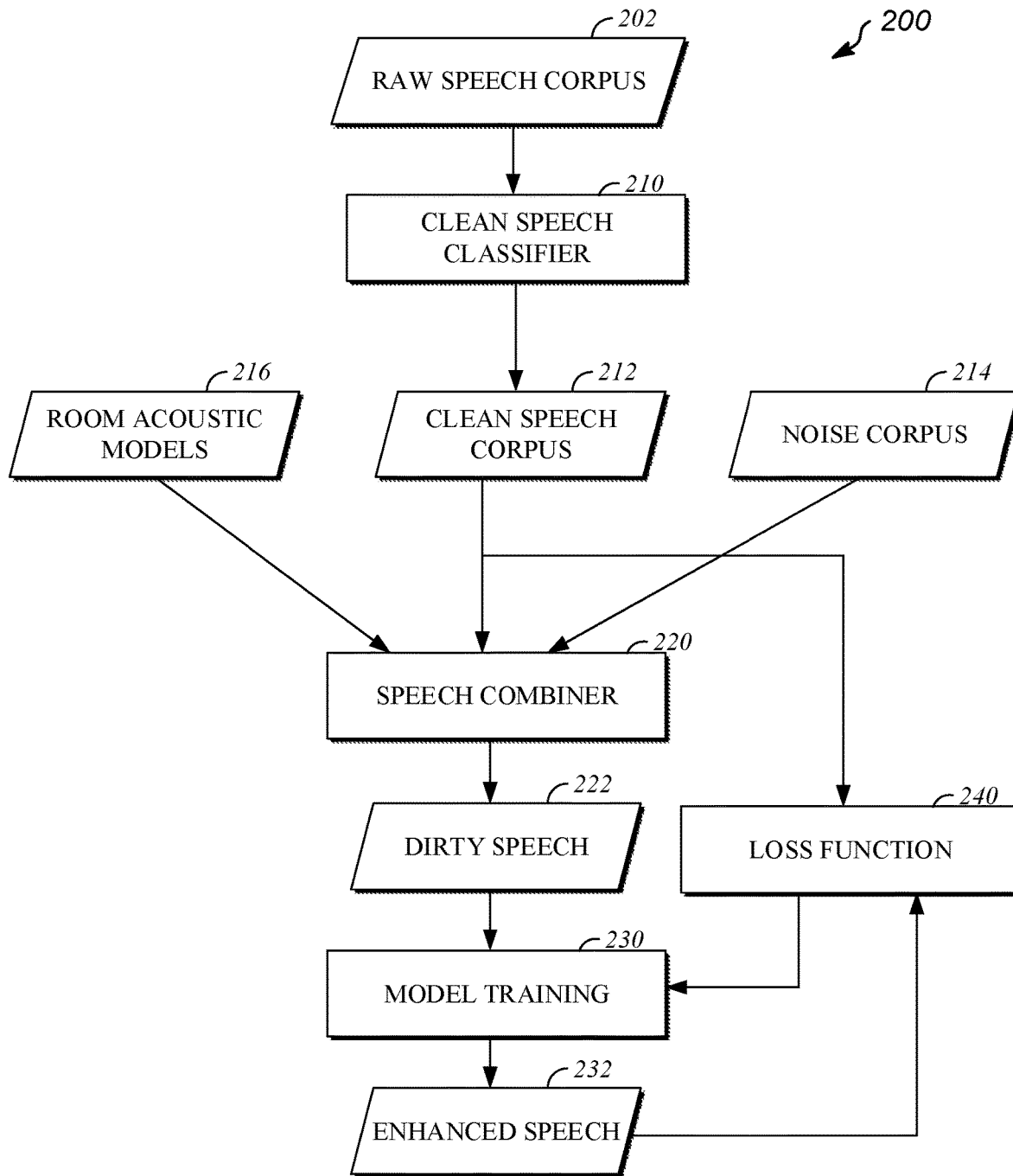
FIG. 2 is a block diagram of an example of a system for training a speech enhancement network.

The system 100 includes a speech enhancement network 130 that may be trained to determine an enhanced speech segment 131 based on a window of audio samples 121 for which the speech enhancement network 130 has been selected based on a classification of the window of audio samples 121 determined by the audio segmentation and classification module 120. Speech enhancement may be a complex and sophisticated audio enhancement method in the system 100. For example, the speech enhancement network 130 may be a learned system, using deep neural network structures trained on a wide variety of speech impaired by noise, speech babble, music and acoustic reverberation to cover the wide range possible speech inputs. The training of the deep neural network may be key to its success in mapping noisy, reverberant speech into cleaner speech with less reverberation. An example of a structure of a training process is shown in FIG. 2. For example, the process 700 of FIG. 7 may be implemented to train a neural network of the speech enhancement network 130.

For example, a window of audio samples 121 may be processed into a mix of temporal and spectral features used by a deep neural network from which enhanced speech segment 131 is filtered and regenerated. For example, evaluation of the enhancement deep neural network may operate on an input span of 0.5 seconds to 2 seconds of noisy audio. This window duration may create an input audio context that spans multiple speech phonemes and even multiple words. By spanning more phonemes, the network may be provided sufficient contextual information to allow the model to capture statistically frequent sound and even word usage patterns in a target language. In addition, complex noise patterns can effectively be learned to assist in removal of these interferers. Together, the speech enhancement network 130 may disambiguate speech from noise more effectively and even partially reconstruct the more plausible missing speech sounds if they have been completely masked by noise. The speech enhancement network 130 may operate on just the current input samples, and samples in the past, or may operate on current sample, and samples both before and after the current time. Looking "ahead" by some hundreds of milliseconds the accuracy can be improved, but this technique may increase the latency of the system 100 by the extent of look ahead. In some implementations, a deep neural network of the speech enhancement network 130 is applied to overlapping input audio segments. For example, a deep neural network may be applied as illustrated by FIG. 6B. The input overlaps may be chosen to both provide sufficient context for speech reconstruction and to allow the output windows to overlap. For example, overlapping output windows may be combined by averaging (e.g., using a weighted average) the results sample by sample. This technique may increase continuity and reduce audio artifacts in the enhanced speech segment 131. In some implementations (e.g., for low-latency applications such as telephony), no look-ahead or a short look-ahead (on the order of a few milliseconds) may be used for audio enhancement processing. For example, to reduce latency, substantially overlapping (e.g., 87.5% overlapped) windows may be subjected to audio processing.

In some implementations (not shown in FIG. 1), the system 100 is augmented to include multiple speech enhancement networks that are tailored for different types of speech signals. For example, the system may include a general speech enhancement network, a child speech enhancement network, a wind-impaired speech enhancement network, and/or speaker-specific speech enhancement networks that are adapted to the speech of individual users. These multiple speech enhancement networks may be selected for application to an audio segment based on one or more classifications and/or a speaker identification. In some implementations, multiple speech enhancement networks may be applied concurrently, with their outputs combined in a probabilistic fashion (e.g., based on estimated probabilities of the presence of different types of speech and noise sources).

The system 100 includes a music enhancement network 132 that may be trained to determine an enhanced music segment 133 based on a window of audio samples 123 for which the music enhancement network 132 has been selected based on a classification of the window of audio samples 123 determined by the audio segmentation and classification module 120. Music enhancement may follow a similar strategy and structure as speech enhancement, but where the goal is to remove interfering background speech and noise from dominant music content. A clean music corpus for training the music enhancement network 132 may be gathered from available music libraries, and many of the same noise interference sources from speech enhancement can be used as well.

The system 100 includes a noise enhancement network 134 that may be trained to determine an enhanced noise segment 135 based on a window of audio samples 125 for which the noise enhancement network 134 has been selected based on a classification of the window of audio samples 125 determined by the audio segmentation and classification module 120. For example, the noise enhancement network may be configured to suppress a noisy portion of the audio track 112 by scaling the signal down. In some implementations, the noise enhancement network 134 may pass an enhanced noise segment 135 with little or no modification of corresponding samples from the window of audio samples 125 in order to avoid introducing additional distortion.

The system 100 includes a merging module 140 that may be configured to combine the enhanced audio segments from the audio enhancement networks (130, 132, and 134) into one or more audio tracks that may be re-synchronized with the visual track 114 and/or encoded (e.g., according to a standardized AV data format, such as MP4 or MOV) to generate enhanced video 142. For example, as each segment of audio is passed through the appropriate enhancer (130, 132, or 134), it is reconstructed into a continuous audio stream, recompressed according to the requirements of the original AV data format and recombined with the video image sequence content of the visual track 114. This structure is then mapped to a file or to a stream as required by an end application (e.g., video storage or video playback).

In some usage scenarios multiple types of distortions are present. In some implementations (not shown in FIG. 1), a soft classification is determined that estimates what types of noise sources are present in the current window of audio samples (e.g., wind, street, competing talker) and with what probabilities. A corresponding enhanced audio segment may be determined based on a linear combination of the outputs of audio enhancement networks tailored to detecting and suppressing respective sources of noise and distortions (e.g., wind, street and competing talker attenuation), where the linear combination is determined with weights that are based on probabilities of these respective sources of noise and distortion. This type of probabilistic fusion of outputs from multiple audio enhancement networks (e.g., speech enhancement networks) may be well suited for enhancement of real-life mixtures where multiple noise sources are present, although this approach may consume more computing resources in order to run multiple audio enhancement networks in parallel.

FIG. 2 is a block diagram of an example of a system 200 for training a speech enhancement network. The system 200 includes a clean speech classifier 210 that is configured to process raw speech samples from a raw speech corpus 202 and select examples with low noise or other distortions for inclusion in a clean speech corpus 212. For example, the clean speech corpus 212 may be a collection of hundreds of thousands of examples of English speech, totaling tens of thousands of hours of unique speech from thousands of different speakers. The sources may be chosen to be to be as free as possible of background noise and reverberation. Sources of audio in the raw speech corpus 202 may include, for example, the open collection of TED lectures, the LibriSpeech database of audio books, examples from the United States Library of Congress. Sources may be selected from a collected raw speech corpus 202 by pre-filtering through a clean speech classifier 210, which may be similar to the content type classifier described in relation to the audio segmentation and classification module 120 of FIG. 1. In some implementations, only content with high confidence of being clean is passed into the clean speech corpus 212 for inclusion in the building of speech mixes.

A noise corpus 214 is also collected from many sources for background noise, including recordings from cafés, streets, construction sites, cars, airplanes, bars, and video and audio production sound effects. Common human-generated non-speech noises, such as laughter and applause are included in the noise corpus 214.

The room acoustic models 216 are another feature used for training data augmentation. For example, thousands of different room acoustic models may be constructed representing a wide diversity of listening environments. A room acoustic model is used to generate a set of room impulse responses for a set of spatially distributed acoustic sources. Each room impulse response represents the magnitude and delay of audio reflections off the surfaces of the modeled room at the receiver location. In a large space with highly reflective surfaces, a single sound may echo for more than a second, as the sound waves bounce back and forth in the room. Smaller rooms have faster reverberations and more absorbent materials have lower magnitude reflections. Moreover, room materials may have non-uniform frequency response, absorbing some frequency bands more than others. A highly reverberant room may muddle the speech making it significantly less intelligible because at each moment the original direct speech source is combined with the delayed echoes from all the sounds in the room. This may lead to a reduced depth of speech envelope modulations, which are important carriers of speech intelligibility.

The system 200 includes a speech combiner 220 that is configured to select a clean speech example from the clean speech corpus 212, one or more interfering noise examples from the noise corpus 214, and a room acoustic model from the room acoustic models 216. For example, the noise may be combined with the speech by simple linear combination (additive noise) or may use a more complex combination function to represent the effects of microphone saturation or the Lombard effect, where by speakers raise their voices in the presence of noise. In some implementations the room acoustic model is applied to the combination to create realistic speech+noise interference mixes. In some implementations, the room acoustic model may also be applied separately to each of the speech and noise components, before combining them, in order to approximate different speaker and noise source locations in the acoustic space. For example, multiple acoustic sources (e.g., speech, maskers, and/or noises) may be spatially separated. Separate room impulse responses may be determined, using one of the room acoustic models 216, for respective acoustic sources. These room impulse responses may essentially describe the linear filtering that when applied to (e.g., anechoic) acoustic signals would produce the signal observed at the acoustic receiver (e.g., microphone) location. That is, at the microphone location, the acoustic signal arrives via many paths with different delays and attenuations. These signals convolved with the room impulse responses may be combined (e.g., linearly combined) at the microphone location. The combined signal may be a simulated mixture at the microphone location, which may be used as a dirty speech 222 signal. Various other audio augmentations can be performed at this stage with parameters and probability of occurrence drawn from predefined distributions. These audio augmentations may include various linear and non-linear transformations (e.g., frequency shaping, time and/or frequency modulations, expansion or compression in time and/or amplitude, saturation, phase distortions, etc.). These may be applied to individual sound sources prior to mixing, and/or to the final mixture (e.g., to simulate various effects of electroacoustic transducers utilized in consumer audio products, such as mobile phones). These audio augmentations may be applied in order to help improve robustness and generalization of data-driven audio algorithms to a wide range of real-life noisy/degraded audio stimuli.

The dirty speech 222 signals are used by a model training module 230 for training a speech enhancement network (e.g., including a neural network). The speech enhancement network outputs enhanced speech 232 in response to a dirty speech 222 signal. A loss function module 240 determines an error signal based on the enhanced speech 232 and a corresponding clean speech signal that was used to generate the dirty speech 222. This error signal is used by the model training module 130 as feedback for training the speech enhancement network. For example, the model training module may implement a backpropagation algorithm to update parameters (e.g. coefficients) of the speech enhancement network based on the error signals from the loss function module 240.

By combining many permutations of the available clean speech samples and noise source samples (from a large set of speech and noise corpora (212 and 214)), room acoustic models, and other types of audio augmentations (e.g., distortions); a very large set of diverse but realistic training data inputs may be generated as dirty speech 222 samples. The typical training a single speech enhancement deep neural network may train on hundreds of thousands of hours of dirty speech 222 content to achieve high quality speech enhancement.

FIG. 3A is a block diagram of an example of a system 300 configured for data driven audio enhancement. The system 300 includes a video capture device 310 (e.g., a camera or a drone) that includes a processing apparatus 312 that is configured to receive images from one or more image sensors 314 and audio from one or more microphones 316. The processing apparatus 312 may include an audio classifier and multiple audio enhancement networks (e.g., implemented as a software module or a specialized hardware module) configured to classify and enhance segments of audio captured by the one or more microphones 316. The processing apparatus 312 may be configured to use the classifier to selectively apply the audio enhancement networks to the audio captured using the one or more microphones 316 to obtain enhanced audio segments that can be combined and/or merged, with a visual track, to form enhanced video. The video capture device 310 includes one or more motion sensors 318 configured to detect motion of the one or more image sensors 314 and the one or more microphones 316. The video capture device 310 includes a user interface 320, which may allow a user to control video capture functions and/or view video. The video capture device 310 includes a communications interface 322 for transferring video to other devices. The video capture device 310 includes a battery 324 for powering the video capture device 310. For example, the system 300 may be used to implement processes described in this disclosure, such as the process 500 of FIG. 5 and/or the process 700 of FIG. 7.

The processing apparatus 312 may include one or more processors having single or multiple processing cores. The processing apparatus 312 may include memory, such as a random-access memory (RAM) device, flash memory, or any other suitable type of storage device, such as a non-transitory computer readable memory. The memory of the processing apparatus 312 may include executable instructions and data that can be accessed by one or more processors of the processing apparatus 312. For example, the processing apparatus 312 may include one or more DRAM modules, such as double data rate synchronous dynamic random-access memory (DDR SDRAM). In some implementations, the processing apparatus 312 may include a graphical processing unit (GPU). In some implementations, the processing apparatus 312 may include a digital signal processor (DSP). In some implementations, the processing apparatus 312 may include an application specific integrated circuit (ASIC). For example, the processing apparatus 312 may include a custom audio signal processor. In some implementations, the processing apparatus 312 may have multiple processing units in different portions of the video capture device 310.

The processing apparatus 312 may include an audio classifier and multiple audio enhancement networks (e.g., a speech enhancement network and/or a music enhancement network) configured to reduce noise and distortion of audio signals captured using the one or more microphones 316. For example, the audio classifier and the multiple audio enhancement networks may be implemented by software executed by the processing apparatus 312. The processing apparatus 312 may be configured to access audio data; determine a window of audio samples based on the audio data; input the window of audio samples to a classifier to obtain a classification, in which the classifier includes a neural network and the classification takes a value from a set of multiple classes of audio that includes a speech class and a music class; select, based on the classification, an audio enhancement network from a set of multiple audio enhancement networks; apply the selected audio enhancement network to the window of audio samples to obtain an enhanced audio segment, in which the selected audio enhancement network includes a neural network that has been trained using audio signals of a type associated with the classification; and store, play, or transmit an enhanced audio signal based on the enhanced audio segment. For example, the processing apparatus 312 may be configured to determine, using the classifier, a secondary classification based on the window of audio samples; and select, based on the secondary classification, an audio enhancement network from a set of multiple audio enhancement networks. For example, the processing apparatus 312 may be configured to select, based on a classification and a secondary classification output by the classifier for another window of audio samples from the audio data, an audio enhancement network from a set of multiple audio enhancement networks. For example, the processing apparatus 312 may be configured to extract the audio data from AV data; and merge the enhanced audio signal with a visual track from the AV data. For example, the processing apparatus 312 may be configured to detect a pair of lips in images from the visual track corresponding to the window of audio samples; and input data based on image portions depicting the pair of lips to the classifier, in which the classification depends in part on the image portions depicting the pair of lips. For example, the processing apparatus 312 may be configured to detect a pair of lips in images from the visual track corresponding to the window of audio samples; and input data based on image portions depicting the pair of lips to the selected audio enhancement network, in which the enhanced audio segment depends in part on the image portions depicting the pair of lips. For example, the processing apparatus 312 may be configured to determine a sequence of partially overlapping windows of audio samples, including the window of audio samples, based on the audio data; determine a sequence of respective enhanced audio segments, including the enhanced audio segment, based on the sequence of partially overlapping windows of audio samples using the classifier and at least two of the audio enhancement networks from the set of multiple audio enhancement networks; and determine an enhanced audio signal by blending the sequence of respective enhanced audio segments, including combining (e.g., using weighted averaging) corresponding samples from multiple segments in overlapping portions of the enhanced audio segments. For example, the processing apparatus 312 may be configured to determine a residual noise signal as a difference between an audio signal from the audio data and the enhanced audio signal; and merge the enhanced audio signal with the residual noise signal. For example, the processing apparatus 312 may be configured to input the window of audio samples to a speaker identification network to obtain a speaker identification, in which the speaker identification network includes a neural network that has been trained using speech signals from one or more users to recognize speech signals as uttered by one of the one or more users; and select, based on the speaker identification, the audio enhancement network from the set of multiple audio enhancement networks, in which the selected audio enhancement network includes a neural network that has been trained using speech signals of a person associated with the speaker identification. For example, the processing apparatus 312 may be configured to input the window of audio samples to a speaker identification network to obtain a speaker identification, in which the speaker identification network includes a neural network that has been trained using speech signals from one or more users to recognize speech signals as uttered by one of the one or more users; and select, based on the speaker identification, the audio enhancement network from the set of multiple audio enhancement networks, in which the selected audio enhancement network includes a speaker-specific embedding associated with the speaker identification. In some implementations, the selected audio enhancement network includes a neural network that has been trained using audio signals that have been augmented using room acoustic models. For example, the speech enhancement network may be trained by implementing the process 700 of FIG. 7.

The one or more image sensors 314 are configured to capture images. The one or more image sensors 314 are configured to detect light of a certain spectrum (e.g., the visible spectrum or the infrared spectrum) and convey information constituting an image as electrical signals (e.g., analog or digital signals). For example, the one or more image sensors 314 may include charge-coupled devices (CCD) or active pixel sensors in complementary metal-oxide-semiconductors (CMOS). The one or more image sensors 314 may detect light incident through respective lens (e.g., a fisheye lens). In some implementations, the one or more image sensors 314 include digital-to-analog converters. In some implementations, the one or more image sensors 314 have respective fields of view that overlap. The one or more image sensors 314 are attached to the processing apparatus 312 as components of the video capture device 310.

The one or more microphones 316 are configured to capture the audio data. The audio data may include one or more audio tracks that are synchronized with one or more visual tracks captured by the one or more image sensors 314. The one or more microphones 316 may convert sound waves incident on the one or more microphones 316 into one or more digital audio recordings. The one or more microphones 316 may detect sound and convey information constituting an audio signal as electrical signals (e.g., analog or digital signals). In some implementations, the one or more microphones 316 include an analog-to-digital converter. The one or more microphones 316 may include a microphone configured to capture sound in a vicinity of the video capture device 310. In some implementations, the one or more microphones 316 include an array of microphones to enable beamforming processing of sound incident on the one or more microphones 316.

The one or more motion sensors 318 are configured to detect motion of the one or more image sensors 314 and/or the one or more microphones 316. For example, the one or more motion sensors 318 may include parts of an inertial measurement unit (e.g., including gyroscopes, accelerometers, and/or magnetometers) that is mounted in a housing with the one or more image sensors 314 and the one or more microphones 316. The processing apparatus 312 may be configured to determine a sequence of orientation estimates based on sensor data from the one or more motion sensors 318. For example, determining the sequence of orientation estimates may include applying quadratic estimation to sensor data from a plurality of the one or more motion sensors 318.

The video capture device 310 may include a user interface 320. For example, the user interface 320 may include an LCD display and one or more speakers for presenting video and/or messages to a user. For example, the user interface 320 may include a button or switch enabling a person to manually turn the video capture device 310 on and off. For example, the user interface 320 may include a record button for controlling video capture.

The video capture device 310 may include a communications interface 322, which may enable communications with a personal computing device (e.g., a smartphone, a tablet, a laptop computer, or a desktop computer). For example, the communications interface 322 may be used to receive commands controlling video capture and processing in the video capture device 310. For example, the communications interface 322 may be used to transfer AV data to a personal computing device. For example, the communications interface 322 may include a wired interface, such as a high-definition multimedia interface (HDMI), a universal serial bus (USB) interface, or a FireWire interface. For example, the communications interface 322 may include a wireless interface, such as a Bluetooth interface, a ZigBee interface, and/or a Wi-Fi interface.

The video capture device 310 may include a battery 324 that powers the video capture device 310 and/or its peripherals. For example, the battery 324 may be charged wirelessly or through a micro-USB interface.

FIG. 3B is a block diagram of an example of a system 330 configured for data driven audio enhancement. The system 330 includes a video capture device 340 and a personal computing device 360 that communicate via a communications link 350. The video capture device 340 includes one or more image sensors 342 and one or more microphones 346 that are configured to capture video. The video capture device 340 includes a communications interface 348 configured to transfer AV data via the communication link 350 to the personal computing device 360. The personal computing device 360 includes a processing apparatus 362 that is configured to receive, using the communications interface 366, images from the one or more image sensors 342 and audio data from the one or more microphones 346. The video capture device 340 includes a fastening article 344 attached to the one or more image sensors 342 and the one or more microphones 346 and configured to hold the one or more image sensors 342 and the one or more microphones 346 in place on a portion (e.g., a head, a chest, or an arm) of a human body. The processing apparatus 362 may include an audio classifier and multiple audio enhancement networks (e.g., implemented as a software module or a specialized hardware module) configured to classify and enhance segments of audio captured by the one or more microphones 346. The processing apparatus 362 may be configured to use the classifier to selectively apply the audio enhancement networks to the audio captured using the one or more microphones 346 to obtain enhanced audio segments that can be combined and/or merged, with a visual track, to form enhanced video. For example, the system 330 may be used to implement processes described in this disclosure, such as the process 500 of FIG. 5 and/or the process 700 of FIG. 7.

The one or more image sensors 342 are configured to capture images. The one or more image sensors 342 are configured to detect light of a certain spectrum (e.g., the visible spectrum or the infrared spectrum) and convey information constituting an image as electrical signals (e.g., analog or digital signals). For example, the one or more image sensors 342 may include charge-coupled devices (CCD) or active pixel sensors in complementary metal-oxide-semiconductors (CMOS). The one or more image sensors 342 may detect light incident through respective lenses (e.g., a fisheye lens). In some implementations, the one or more image sensors 342 include digital-to-analog converters. In some implementations, the one or more image sensors 342 have respective fields of view that overlap.

The fastening article 344 is attached to the one or more image sensors 342 and the one or more microphones 346 and configured to hold the one or more image sensors 342 and the one or more microphones 346 in place on a portion of a human body. For example, the fastening article 344 may include glasses or goggles that, when worn by a human, fasten the one or more image sensors 342 and the one or more microphones 346 in place on a head of the human. For example, the fastening article 344 may include a wristband that, when worn by a human, fastens the one or more image sensors 342 and the one or more microphones 346 in place on an arm of the human. For example, the fastening article 344 may include a shirt or vest that, when worn by a human, fastens the one or more image sensors 342 and the one or more microphones 346 in place on a chest of the human. For example, the fastening article 344 may include a band or strap of a headset configured for augmented reality applications and/or virtual reality applications that, when worn by a human, fastens the one or more image sensors 342 and the one or more microphones 346 in place on a head of the human.

The one or more microphones 346 are configured to capture the audio data. The audio data may include one or more audio tracks that are synchronized with one or more visual tracks captured by the one or more image sensors 342. The one or more microphones 346 may convert sound waves incident on the one or more microphones 346 into one or more digital audio recordings. The one or more microphones 346 may detect sound and convey information constituting an audio signal as electrical signals (e.g., analog or digital signals). In some implementations, the one or more microphones 346 include an analog-to-digital converter. The one or more microphones 346 may include a microphone configured to capture sound in a vicinity of the video capture device 340. In some implementations, the one or more microphones 346 include an array of microphones to enable beamforming processing of sound incident on the one or more microphones 346.

The communications link 350 may be a wired communications link or a wireless communications link. The communications interface 348 and the communications interface 366 may enable communications over the communications link 350. For example, the communications interface 348 and the communications interface 366 may include a high-definition multimedia interface (HDMI), a universal serial bus (USB) interface, a FireWire interface, a Bluetooth interface, a ZigBee interface, and/or a Wi-Fi interface. For example, the communications interface 348 and the communications interface 366 may be used to transfer AV data from the video capture device 340 to the personal computing device 360 for signal processing (e.g., audio enhancement, filtering, tone mapping, stitching, encoding) to generate output images and/or metadata based on AV data from the one or more image sensors 342 and the one or more microphones 346. For example, the communications interface 348 and the communications interface 366 may be used to transfer control signals to the video capture device 340 from the personal computing device 360 for controlling capture of video.

The processing apparatus 362 may include one or more processors having single or multiple processing cores. The processing apparatus 362 may include memory, such as a random-access memory (RAM) device, flash memory, or any other suitable type of storage device, such as a non-transitory computer readable memory. The memory of the processing apparatus 362 may include executable instructions and data that can be accessed by one or more processors of the processing apparatus 362. For example, the processing apparatus 362 may include one or more DRAM modules, such as double data rate synchronous dynamic random-access memory (DDR SDRAM). In some implementations, the processing apparatus 362 may include a graphical processing unit (GPU). In some implementations, the processing apparatus 362 may include a digital signal processor (DSP). In some implementations, the processing apparatus 362 may include an application specific integrated circuit (ASIC). For example, the processing apparatus 362 may include a custom image signal processor.

The processing apparatus 362 may include an audio classifier and multiple audio enhancement networks (e.g., a speech enhancement network and/or a music enhancement network) configured to reduce noise and distortion of audio signals captured using the one or more microphones 346. For example, the audio classifier and the multiple audio enhancement networks may be implemented by software executed by the processing apparatus 362. The processing apparatus 362 may be configured to access audio data; determine a window of audio samples based on the audio data; input the window of audio samples to a classifier to obtain a classification, in which the classifier includes a neural network and the classification takes a value from a set of multiple classes of audio that includes a speech class and a music class; select, based on the classification, an audio enhancement network from a set of multiple audio enhancement networks; apply the selected audio enhancement network to the window of audio samples to obtain an enhanced audio segment, in which the selected audio enhancement network includes a neural network that has been trained using audio signals of a type associated with the classification; and store, play, or transmit an enhanced audio signal based on the enhanced audio segment. For example, the processing apparatus 362 may be configured to determine, using the classifier, a secondary classification based on the window of audio samples; and select, based on the secondary classification, an audio enhancement network from a set of multiple audio enhancement networks. For example, the processing apparatus 362 may be configured to select, based on a classification and a secondary classification output by the classifier for another window of audio samples from the audio data, an audio enhancement network from a set of multiple audio enhancement networks. For example, the processing apparatus 362 may be configured to extract the audio data from AV data; and merge the enhanced audio signal with a visual track from the AV data. For example, the processing apparatus 362 may be configured to detect a pair of lips in images from the visual track corresponding to the window of audio samples; and input data based on image portions depicting the pair of lips to the classifier, in which the classification depends in part on the image portions depicting the pair of lips. For example, the processing apparatus 362 may be configured to detect a pair of lips in images from the visual track corresponding to the window of audio samples; and input data based on image portions depicting the pair of lips to the selected audio enhancement network, in which the enhanced audio segment depends in part on the image portions depicting the pair of lips. For example, the processing apparatus 362 may be configured to determine a sequence of partially overlapping windows of audio samples, including the window of audio samples, based on the audio data; determine a sequence of respective enhanced audio segments, including the enhanced audio segment, based on the sequence of partially overlapping windows of audio samples using the classifier and at least two of the audio enhancement networks from the set of multiple audio enhancement networks; and determine an enhanced audio signal by blending the sequence of respective enhanced audio segments, including combining (e.g., using weighted averaging) corresponding samples from multiple segments in overlapping portions of the enhanced audio segments. For example, the processing apparatus 362 may be configured to determine a residual noise signal as a difference between an audio signal from the audio data and the enhanced audio signal; and merge the enhanced audio signal with the residual noise signal. For example, the processing apparatus 362 may be configured to input the window of audio samples to a speaker identification network to obtain a speaker identification, in which the speaker identification network includes a neural network that has been trained using speech signals from one or more users to recognize speech signals as uttered by one of the one or more users; and select, based on the speaker identification, the audio enhancement network from the set of multiple audio enhancement networks, in which the selected audio enhancement network includes a neural network that has been trained using speech signals of a person associated with the speaker identification. For example, the processing apparatus 362 may be configured to input the window of audio samples to a speaker identification network to obtain a speaker identification, in which the speaker identification network includes a neural network that has been trained using speech signals from one or more users to recognize speech signals as uttered by one of the one or more users; and select, based on the speaker identification, the audio enhancement network from the set of multiple audio enhancement networks, in which the selected audio enhancement network includes a speaker-specific embedding associated with the speaker identification. In some implementations, the selected audio enhancement network includes a neural network that has been trained using audio signals that have been augmented using room acoustic models. For example, the speech enhancement network may be trained by implementing the process 700 of FIG. 7.

The personal computing device 360 may include a user interface 364. For example, the user interface 364 may include a touchscreen display and one or more speakers for presenting video and/or messages to a user and receiving commands from a user. For example, the user interface 364 may include goggles or a headset with a display configured to support augmented reality applications. For example, the user interface 364 may include a button or switch enabling a person to manually turn the personal computing device 360 on and off. In some implementations, commands (e.g., start recording video, stop recording video, or snap photograph) received via the user interface 364 may be passed on to the video capture device 340 via the communications link 350.

Figure 4:
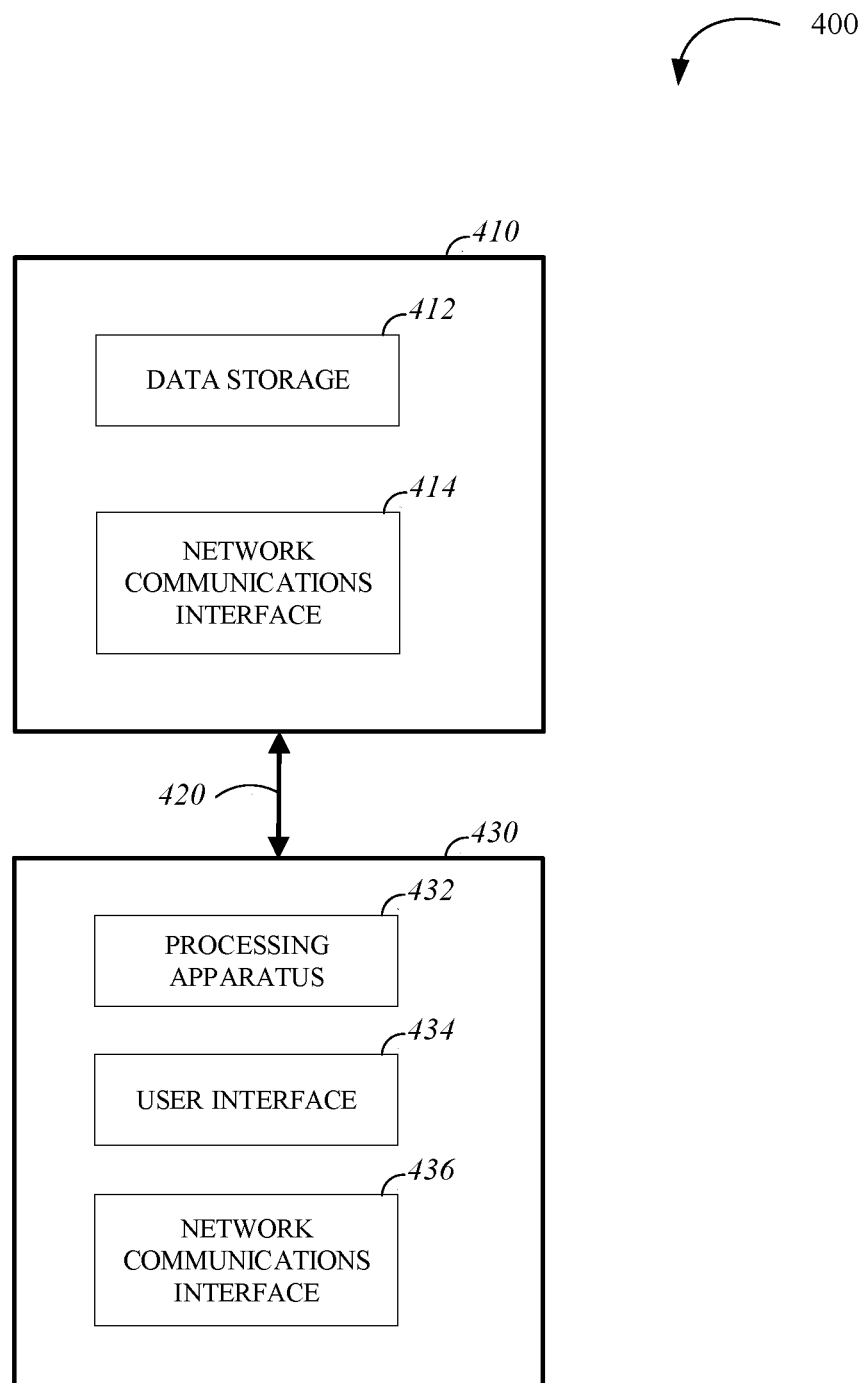
FIG. 4 is a block diagram of an example of a system configured for data driven audio enhancement.

FIG. 4 is a block diagram of an example of a system 400 configured for data driven audio enhancement. The system 400 includes a media server 410 that stores and provides access (e.g., for download or streaming) to media files (e.g., video files and/or other audio files). The media server 410 includes a data storage 412 and a network communications interface 414. The system 400 includes a computing device 430 that is configured to provide an audio enhancement service for stored audio (e.g., audio tracks from video). The computing device 430 includes a processing apparatus 432, a user interface 434, and a network communications interface 436. The computing device 430 may communicate with the media server 410 via a network communications link 420. The processing apparatus may be configured to apply audio enhancement processing to audio data stored by the media server 410 to update files on the media server 410 with enhanced audio and/or to enhance audio on demand for presentation via speakers of the user interface 434 (e.g., the audio enhancement may be integrated with a local audio playback function). For example, the system 400 may be used to implement processes described in this disclosure, such as the process 500 of FIG. 5 and/or the process 700 of FIG. 7.

The media server includes a data storage 412. The data storage may be used to store video files or other types of audio files. For example, the data storage 412 may include a non-volatile information storage device such as a hard drive, a solid-state drive, a read-only memory device (ROM), an optical disc, a magnetic disc, or any other suitable type of storage device such as a non-transitory computer readable memory. The data storage 412 may include another type of device, or multiple devices, capable of storing data (e.g., AV data or other audio data) for retrieval or processing.

The media server includes a network communications interface 414. The network communications interface 414 may enable remote access to AV data or other audio data stored on in the data storage 412. For example, the network communications interface 414 may implement one or more network communications protocols (e.g., Ethernet, WiFi, SONET, IPv4 and/or IPv6 protocols).

The computing device 430 includes a processing apparatus 432. The processing apparatus 432 may include one or more processors having single or multiple processing cores. The processing apparatus 432 may include memory, such as a random-access memory (RAM) device, flash memory, or any other suitable type of storage device, such as a non-transitory computer readable memory. The memory of the processing apparatus 432 may include executable instructions and data that can be accessed by one or more processors of the processing apparatus 432. For example, the processing apparatus 432 may include one or more DRAM modules, such as double data rate synchronous dynamic random-access memory (DDR SDRAM). In some implementations, the processing apparatus 432 may include a graphical processing unit (GPU). In some implementations, the processing apparatus 432 may include a digital signal processor (DSP). In some implementations, the processing apparatus 432 may include an application specific integrated circuit (ASIC). For example, the processing apparatus 432 may include a custom image signal processor.

The processing apparatus 432 may include an audio classifier and multiple audio enhancement networks (e.g., a speech enhancement network and/or a music enhancement network) configured to reduce noise and distortion of audio signals stored by the media server 410. For example, the audio classifier and the multiple audio enhancement networks may be implemented by software executed by the processing apparatus 432. The processing apparatus 432 may be configured to access audio data; determine a window of audio samples based on the audio data; input the window of audio samples to a classifier to obtain a classification, in which the classifier includes a neural network and the classification takes a value from a set of multiple classes of audio that includes a speech class and a music class; select, based on the classification, an audio enhancement network from a set of multiple audio enhancement networks; apply the selected audio enhancement network to the window of audio samples to obtain an enhanced audio segment, in which the selected audio enhancement network includes a neural network that has been trained using audio signals of a type associated with the classification; and store, play, or transmit an enhanced audio signal based on the enhanced audio segment. For example, the processing apparatus 432 may be configured to determine, using the classifier, a secondary classification based on the window of audio samples; and select, based on the secondary classification, an audio enhancement network from a set of multiple audio enhancement networks. For example, the processing apparatus 432 may be configured to select, based on a classification and a secondary classification output by the classifier for another window of audio samples from the audio data, an audio enhancement network from a set of multiple audio enhancement networks. For example, the processing apparatus 432 may be configured to extract the audio data from AV data; and merge the enhanced audio signal with a visual track from the AV data. For example, the processing apparatus 432 may be configured to detect a pair of lips in images from the visual track corresponding to the window of audio samples; and input data based on image portions depicting the pair of lips to the classifier, in which the classification depends in part on the image portions depicting the pair of lips. For example, the processing apparatus 432 may be configured to detect a pair of lips in images from the visual track corresponding to the window of audio samples; and input data based on image portions depicting the pair of lips to the selected audio enhancement network, in which the enhanced audio segment depends in part on the image portions depicting the pair of lips. For example, the processing apparatus 432 may be configured to determine a sequence of partially overlapping windows of audio samples, including the window of audio samples, based on the audio data; determine a sequence of respective enhanced audio segments, including the enhanced audio segment, based on the sequence of partially overlapping windows of audio samples using the classifier and at least two of the audio enhancement networks from the set of multiple audio enhancement networks; and determine an enhanced audio signal by blending the sequence of respective enhanced audio segments, including combining (e.g., using weighted averaging) corresponding samples from multiple segments in overlapping portions of the enhanced audio segments. For example, the processing apparatus 432 may be configured to determine a residual noise signal as a difference between an audio signal from the audio data and the enhanced audio signal; and merge the enhanced audio signal with the residual noise signal. For example, the processing apparatus 432 may be configured to input the window of audio samples to a speaker identification network to obtain a speaker identification, in which the speaker identification network includes a neural network that has been trained using speech signals from one or more users to recognize speech signals as uttered by one of the one or more users; and select, based on the speaker identification, the audio enhancement network from the set of multiple audio enhancement networks, in which the selected audio enhancement network includes a neural network that has been trained using speech signals of a person associated with the speaker identification. For example, the processing apparatus 432 may be configured to input the window of audio samples to a speaker identification network to obtain a speaker identification, in which the speaker identification network includes a neural network that has been trained using speech signals from one or more users to recognize speech signals as uttered by one of the one or more users; and select, based on the speaker identification, the audio enhancement network from the set of multiple audio enhancement networks, in which the selected audio enhancement network includes a speaker-specific embedding associated with the speaker identification. In some implementations, the selected audio enhancement network includes a neural network that has been trained using audio signals that have been augmented using room acoustic models. For example, the speech enhancement network may be trained by implementing the process 700 of FIG. 7.

The computing device 430 includes a user interface 434. For example, the user interface 434 may include a touch-screen display and one or more speakers (e.g., headphones) for presenting video and/or messages to a user and receiving commands from a user. For example, the user interface 434 may include goggles or a headset with a display configured to support augmented reality applications. In some implementations, one or more speakers of the user interface 434 are used to play an enhanced audio signal generated by the processing apparatus 432 as part of an integrated audio enhancement and playback function.

The computing device 430 includes a network communications interface 436. The network communications interface 414 may enable access to AV data or other audio data stored on in the data storage 412 of the media server 410. For example, the network communications interface 436 may implement one or more network communications protocols (e.g., Ethernet, WiFi, SONET, IPv4 and/or IPv6 protocols). In some implementations, after an audio signal has been enhanced by the processing apparatus (e.g., by implementing the process 500 of FIG. 5), the resulting enhanced audio signal may be transmitted to the media server 410 via the network communications interface 436 for storage in the data storage 412.

Figure 5:
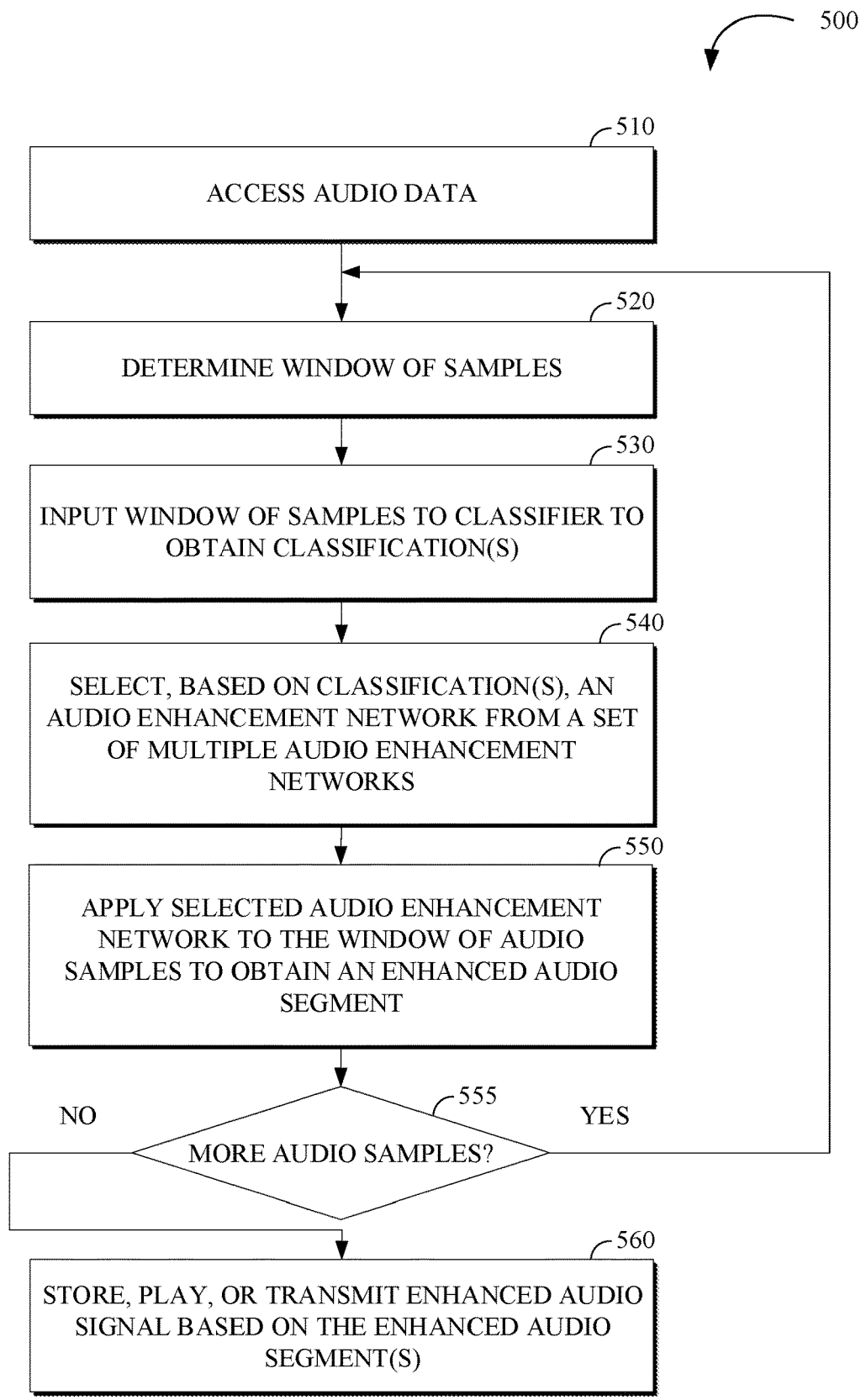
FIG. 5 is a flowchart of an example of a process for data driven audio enhancement.

FIG. 5 is a flowchart of an example of a process 500 for data driven audio enhancement. The process 500 includes accessing 510 audio data; determining 520 a window of audio samples based on the audio data; inputting 530 the window of audio samples to a classifier to obtain a classification; selecting 540, based on the classification, an audio enhancement network from a set of multiple audio enhancement networks; applying 550 the selected audio enhancement network to the window of audio samples to obtain an enhanced audio segment; and storing, playing, or transmitting 560 an enhanced audio signal based on the enhanced audio segment. For example, the process 500 may be implemented by the system 100 of FIG. 1, the system 300 of FIG. 3A, the system 330 of FIG. 3B or the system 400 of FIG. 4. For example, the process 500 may be implemented by a video capture device, such as the video capture device 310 shown in FIG. 3A. For example, the process 500 may be implemented by a computing device, such as the personal computing device 360 or the computing device 430.

The process 500 includes accessing 510 audio data. The audio data may be accessed 510 in variety of ways. For example, the audio data may be accessed 510 by reading directly from a microphone (e.g., the one or more microphones 316) or from a memory via a bus or other interconnect. In some implementations, one or more microphones used to capture the audio data may be part of an audio recording system (e.g., the video capture device 310, or the video capture device 340). In some implementations, the audio is accessed 510 directly from a microphone without intermediate signal processing. In some implementations, the image is accessed 510 after being subjected to intermediate signal processing (e.g., pass-band filtering or encoding and decoding). In some implementations, the audio data is accessed 510 by retrieving the audio data from a memory or other data storage apparatus. For example, the audio data may be accessed 510 by receiving audio data via a communications link (e.g., the communications link 350 or the network communications link 420). For example, the audio data may be accessed 510 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the audio data may be accessed 510 via the communications interface 366 or the network communications interface 436. For example, the audio data may be accessed 510 as an input audio signal, which may represent sound waves in a digital format, such as in a pulse-code modulated format. In some implementations, the audio data may be a one or more audio tracks of a video. For example, accessing 510 the audio data may include extracting the audio data from AV data (e.g., as one or more audio tracks stored as part of a video file). For example, accessing 510 the audio data may include decoding an encoded audio track (e.g., encoded in compliance with a standard, such as MP3 or AAC) to recover a pulse-code modulated audio signal.

The process 500 includes determining 520 a window of audio samples based on the audio data. For example, the duration of the window of audio samples may be fixed and may correspond to the size of an input layer of a neural network in classifier and/or in an audio enhance network. The duration (e.g., 1 second, 2 seconds, or 5 seconds) of the window of audio samples may be chosen to span multiple phonemes or words in a target language of speech to provide sufficient context for classification and/or audio enhancement processing. The duration of the window of audio samples may be chosen to be short enough to track fast changes in the type(s) of audio signals present in the audio data. In some implementations, the window of audio samples is of a longer duration than a corresponding enhanced audio segment that will be generated based on the window of audio samples. For example, the window of audio samples may extend before and/or after the endpoints of the corresponding enhanced audio segment in order to provide look-back and/or look-ahead information to an audio enhancement network that is used to obtain the enhanced audio segment. For example, the window of audio samples may be determined as described in relation to the current window 610 of audio samples of FIG. 6A. In some implementations, determining 520 the window of audio samples is part of determining 520 a sequence of partially overlapping windows of audio samples, including the window of audio samples, based on the audio data. For example, a sequence of partially overlapping windows of audio samples may be determined 520 as described in relation to the window N 660, the window N−1 662, and the window N+1 664 of FIG. 6B. In some implementations, determining 520 a window of audio samples includes iteratively shifting the phase of a window of audio samples that is input to a classifier to search for more precise boundaries or transition times in the audio type classification and selecting the phase of one or more windows of audio samples based on a time offset of a detected transition in a classification of the audio type.

The process 500 includes inputting 530 the window of audio samples to a classifier to obtain a classification. The classifier may include a neural network (e.g., a convolutional deep neural network) and the classification takes a value from a set of multiple classes of audio. For example, the set of multiple classes of audio may include a speech class and a music class, and a corresponding set of multiple audio enhancement networks may include a speech enhancement network and a music enhancement network. For example, a layer of a neural network of the classifier may output a vector of class probabilities (e.g., a softmax function of class activations) with elements for the respective classes in the set of multiple classes. For example, a neural network of the classifier may be trained using labeled audio signal examples of types corresponding to the respective classes in the set of multiple classes.

For example, a secondary classification may be determined, using the classifier, based on the window of audio samples. In some implementations, the classifier also outputs one or more secondary classifications in response to inputting 530 the window of audio samples to the classifier. For example, the classifier may detect speech as a primary classification and background music as a secondary classification. For example, the classifier may detect music as a primary classification and background whispered speech as a secondary classification. For example, a primary classification may correspond to a class with a highest probability in a normalized classification vector and a secondary classification may correspond to a class with a probability in a normalized classification vector that is below a highest such probability and above a threshold (e.g., to a second highest probability on the normalized classification vector). In some implementations, the classifier may be trained with a corpus of audio signal examples that include naturally occurring mixes of audio types (e.g., speech over music or music over speech).

In some implementations, the classifier may take one or more classifications for previous windows of audio samples from the audio data as input and may determine a primary classification and/or one or more secondary classifications for the current window of audio samples based on the one or more previous classifications.

In some implementations (not shown in FIG. 5), a speech signal may be further classified by speaker. For example, an additional trained speaker identification classification network may be used to identify a most likely speaker. For example, a speech signal may be recognized as sourced from a known user (e.g., an individual from a predetermined catalog of possible speakers) that a classifier (e.g., including a neural network) has been trained to recognize. In some implementations, the window of audio samples is input to a speaker identification network to obtain a speaker identification. The speaker identification network may include a neural network that has been trained using speech signals from one or more users to recognize speech signals as uttered by one of the one or more users. In some implementations, a speech signal may be classified by a type of speaker (e.g., age, gender, and/or accent). In some implementations, tagging of with an indication of the speaker identification may be applied to corresponding AV data in a visual track of the video itself or in a side data structure.

In some implementations (not shown in FIG. 5), a speech signal may be classified based in part on detection of lip motion in a corresponding window of a visual track from AV data from which the audio data was extracted. For example, an image sequence from a visual track may be processed in tandem with the audio track, using standard face detection and tracking methods to isolate the lips of each speakers face. For example, the processing of the visual track may include decoding (e.g., according to a video coding standard, such as H.264 or H.265). Images of the lips and facial expression may be used, in conjunction with the noisy audio track to further disambiguate speech from noise. For example, video automatic speech recognition (VASR) algorithms may be employed. A speaker identification can also be reinforced with facial recognition for the speaker. For example, the process 500 may be augmented to include detecting a pair of lips in images from the visual track corresponding to the window of audio samples, and inputting data based on image portions depicting the pair of lips to the classifier, in which the classification depends in part on the image portions depicting the pair of lips.

The process 500 includes selecting 540, based on the classification, an audio enhancement network from a set of multiple audio enhancement networks. In some implementations, the classification is a primary classification and the audio enhancement network is selected 540 based on the primary classification and one or more secondary classifications that are determined based on the window of audio samples using the classifier. For example, the audio enhancement network may be selected using a policy matrix (e.g., the policy matrix of Table 1 above) that maps a primary classification and one or more secondary classifications to a selection of an audio enhancement network. For example, the process 500 may include selecting 540, based on the secondary classification (e.g., in addition to the primary classification), the audio enhancement network from a set of multiple audio enhancement networks. In some implementations, the selection of an audio enhancement network depends on a primary classification and/or one or more secondary classifications for another window of audio samples (e.g., a previous window and/or a subsequent window) in addition to the primary classification and/or one or more secondary classifications for the current window of audio samples. For example, the audio enhancement network may be selected using a policy matrix (e.g., a policy matrix of higher dimension than the 3×4 policy matrix of Table 1, representing permutations of the considered classifications) that maps the classifications considered to a selection of an audio enhancement network. For example, the process 500 may include selecting 540, based on a classification and a secondary classification output by the classifier for another window of audio samples from the audio data, an audio enhancement network from a set of multiple audio enhancement networks.

In some implementations (not shown in FIG. 5), a speech signal may be further classified by speaker and the audio enhancement network may be selected and/or modified based on the speaker identification. For example, once the likely speaker is identified by voice and/or facial recognition, the speech enhancement may be further improved by being swapping in a speaker-specific deep neural for speech improvement, or bring in a speaker-specific embedding (e.g., an "i-vector") to a speech enhancement network trained to use speaker embedding information to further improve disambiguation of speech from noise. For example, the process 500 may include selecting 540, based on the speaker identification (e.g., in addition to one or more classifications), the audio enhancement network from the set of multiple audio enhancement networks. For example, the selected audio enhancement network may include a neural network that has been trained using speech signals of a person associated with the speaker identification. In some implementations, the selected audio enhancement network includes a speaker-specific embedding associated with the speaker identification.

The process 500 includes applying 550 the selected audio enhancement network to the window of audio samples to obtain an enhanced audio segment. For example, the selected audio enhancement network may include a neural network that has been trained using audio signals of a type associated with the classification. In some implementations, the selected audio enhancement network includes a neural network that has been trained using audio signals (e.g., speech signals or music signals) that have been augmented using room acoustic models. For example, the selected audio enhancement network may have been trained by implementing the process 700 of FIG. 7. For example, the selected audio enhancement network may have been trained using the system 200 of FIG. 2.

In some implementations (not shown in FIG. 5), a speech signal may be enhanced based in part on detection of lip motion in a corresponding window of a visual track from AV data from which the audio data was extracted. For example, the process 500 may be augmented to include detecting a pair of lips in images from the visual track corresponding to the window of audio samples; and inputting data based on image portions depicting the pair of lips to the selected audio enhancement network, in which the enhanced audio segment depends in part on the image portions depicting the pair of lips.

If (at operation 555) there are more audio samples from the audio data to be processed, then a next window of audio samples is determined 520 and input 530 to the classifier to obtain a classification, and an audio enhancement network is selected 540, based on the classification, and applied 550 to the next window of audio samples to obtain a next enhanced audio segment. The process 500 may continue iteratively until (at operation 555) there are no more windows of audio samples to be processed. For example, the process 500 may include determining a sequence of respective enhanced audio segments, including the enhanced audio segment, based on the sequence of partially overlapping windows of audio samples (e.g., as illustrated in FIG. 6B) using the classifier and at least two audio enhancement networks from the set of multiple audio enhancement networks.

The process 500 includes storing, playing, or transmitting 560 an enhanced audio signal based on the enhanced audio segment. For example, determining the enhanced audio signal may include blending the sequence of respective enhanced audio segments, including combining (e.g., using weighted averaging) corresponding samples from multiple segments in overlapping portions of the enhanced audio segments. In some implementations, where the audio data is extracted from AV data, the enhanced audio signal is merged (e.g., synchronized and encoded) with a visual track from the AV data and stored or transmitted 560 as part of enhanced AV data.

Multiple audio channels or tracks may be used to encode the enhanced audio signal and associated audio signals. For example, once the audio has been enhanced by removing noise and reverberation, the original audio can simply be discarded, as described above, or the audio can be factored into one or more tracks of clean audio and a second set of tracks containing the residual noise. A residual noise track may be computed by subtracting a clean track from a corresponding original track. These tracks may be conveniently represented as stereo channels, so that alternative mixes of audio can be recreated at the time of playback. In some cases, the listener may prefer slightly more noise in the mix if it creates, for a user, a better balance of the original feel of the audio and the reduced noise versions. For example, a residual noise signal may be determined as a difference between an audio signal from the audio data and the enhanced audio signal, and the residual noise signal may be merged with the enhanced audio signal. In some implementations, multiple audio tracks or channels may be used to encode enhanced audio signals corresponding to respective different speakers. In some implementations, an enhanced audio track is included along with a corresponding original, unenhanced audio track. Just as the system can be trained to identify specific speakers, audio tracks with multiple speakers, including overlapping speech, can be decomposed into single speaker tracks where each track attempts to capture the isolated, enhanced speech of just one of the speakers. For example, an enhanced speech segment may be tagged with a speaker identification that was used to select 540 a speaker-specific audio enhancement network for application to the corresponding window of audio samples. The speaker identification tags may be used to select a subset of the enhanced audio segments for inclusion in a speaker-specific audio track or channel.

For example, the enhanced audio signal may be transmitted 560 to an external device (e.g., the media server 410 or a personal computing device) for display or storage. For example, the enhanced audio signal may be stored 560 in memory of a processing apparatus (e.g., the processing apparatus 312, the processing apparatus 362, or the processing apparatus 432). For example, the enhanced audio signal may be played 560 in the user interface 320, in the user interface 364, or in the user interface 434. For example, the enhanced audio signal may be transmitted 560 via the communications interface 322, the communications interface 366, or the network communications interface 436.

Figure 3:
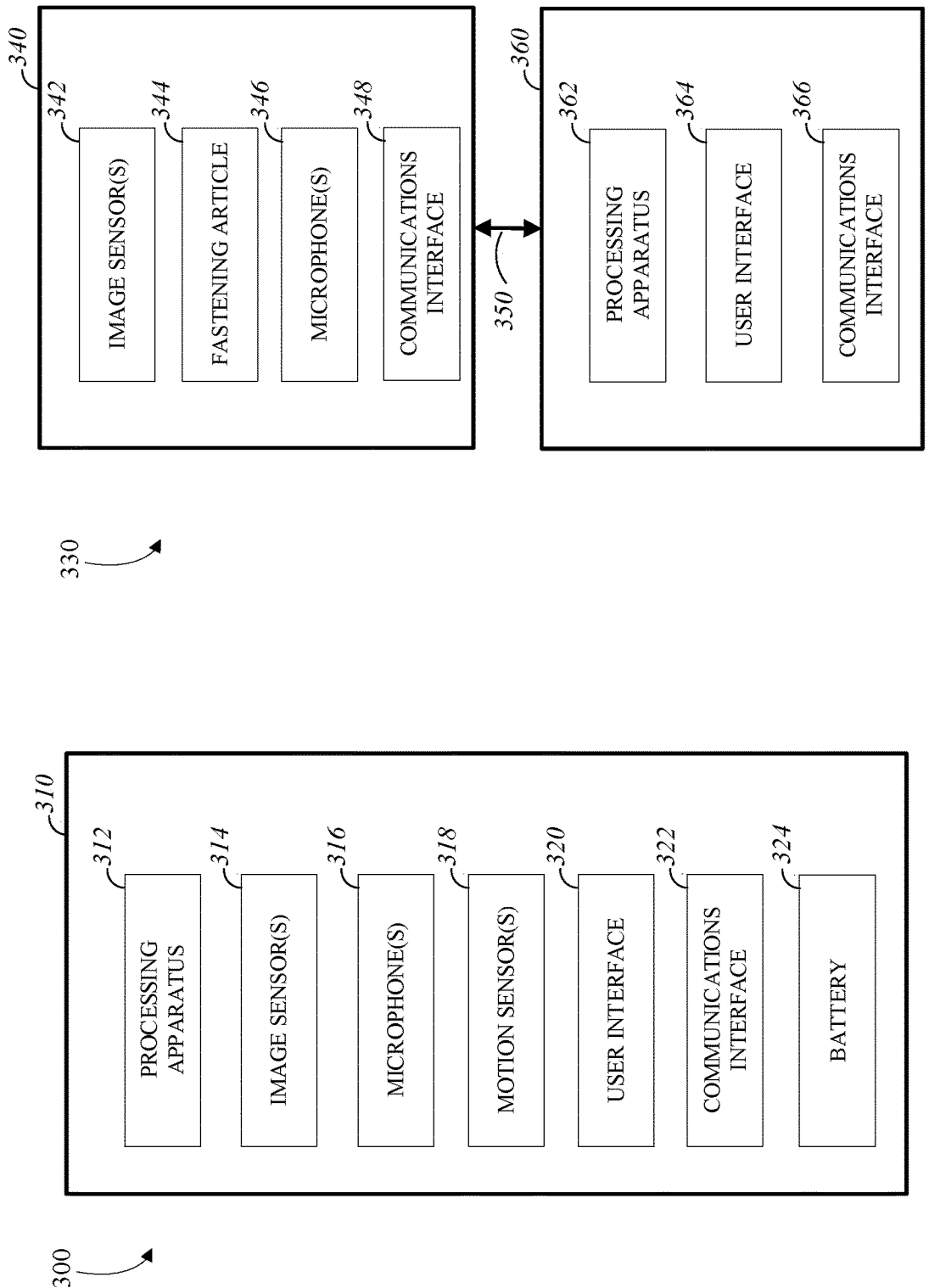
FIG. 3A is a block diagram of an example of a system configured for video capture with data driven audio enhancement.
FIG. 3B is a block diagram of an example of a system configured for video capture with data driven audio enhancement.
Figure 6A:
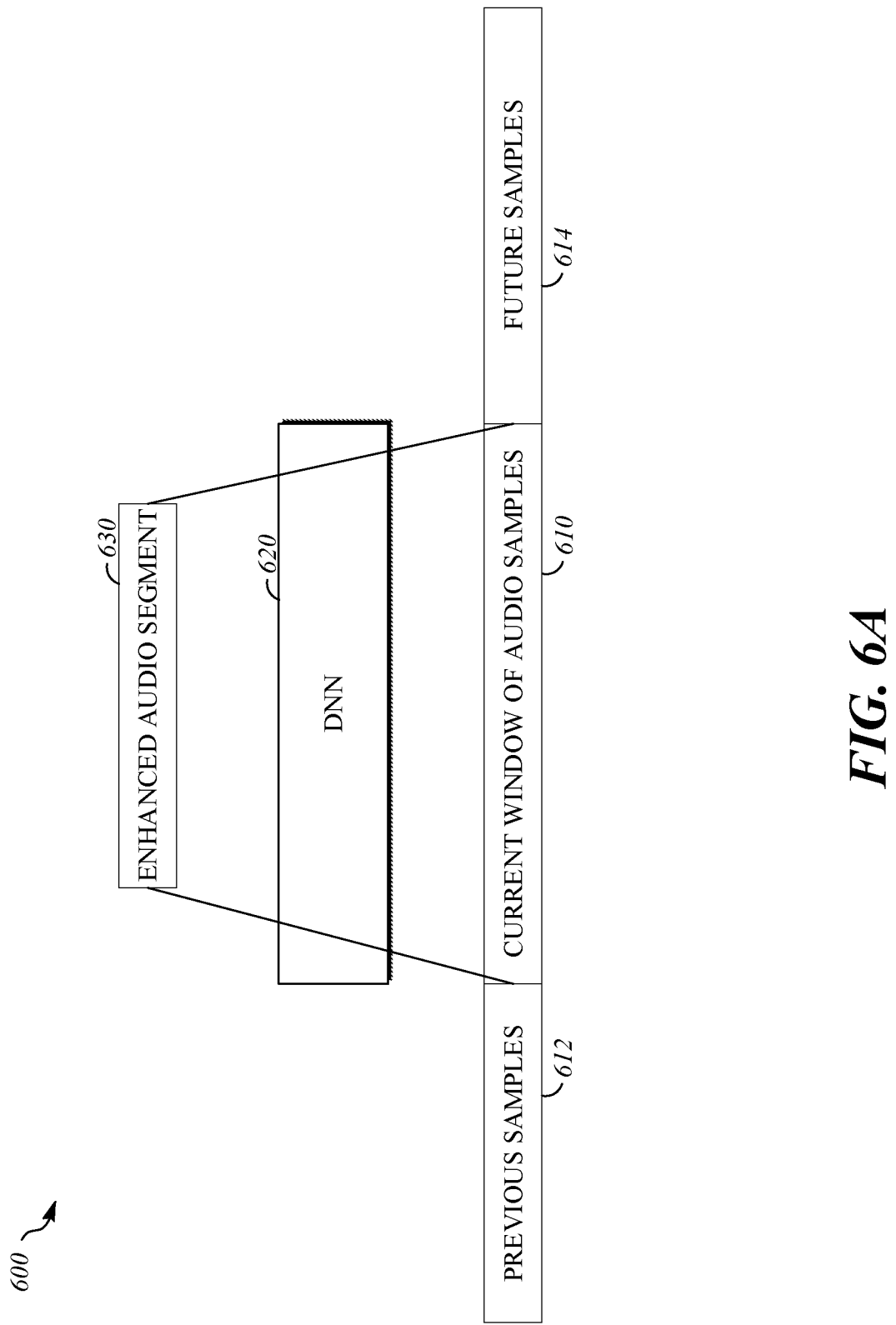
FIG. 6A is an illustration of an example of audio enhancement processing for a window of audio samples to generate an enhanced audio segment.
Figure 6B:
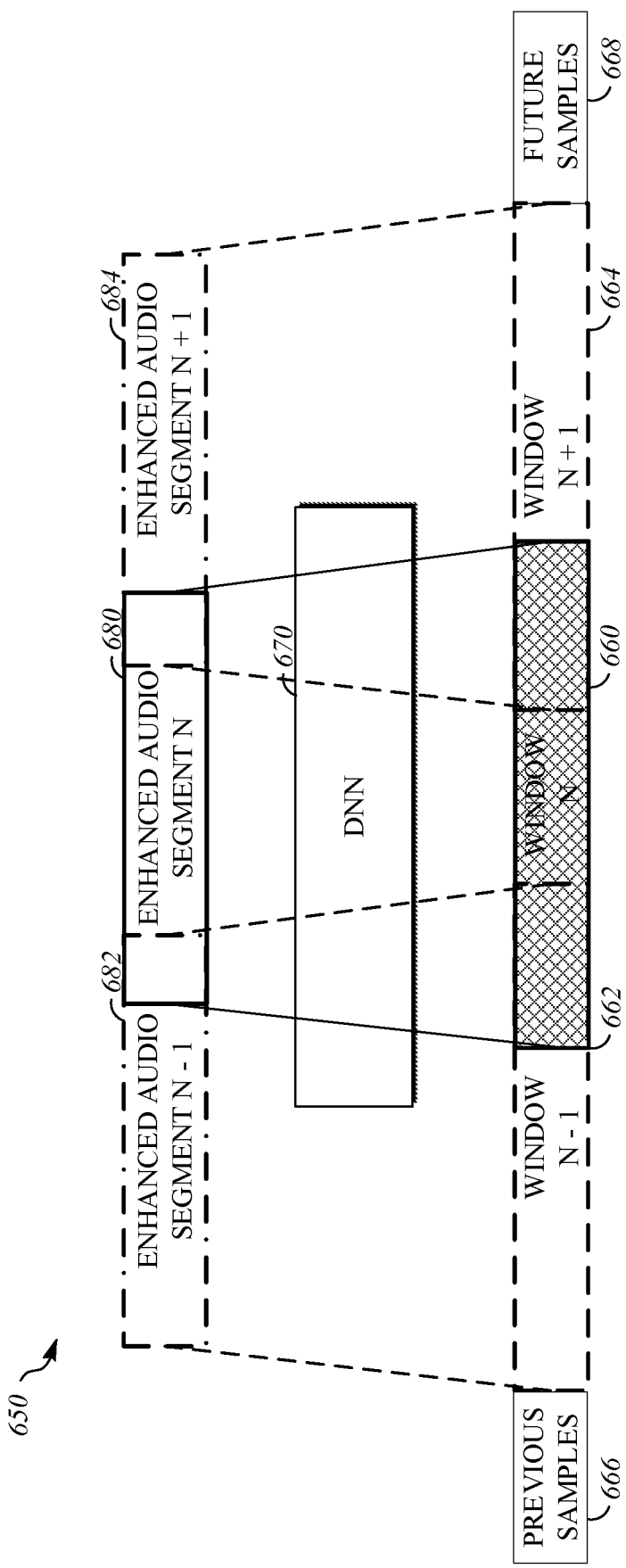
FIG. 6B is an illustration of an example of audio enhancement processing for overlapping windows of audio samples to generate overlapping enhanced audio segments.

FIG. 6A is an illustration of an example of audio enhancement processing 600 for a window of audio samples to generate an enhanced audio segment. An example structure of a deep neural network for speech enhancement is shown in FIG. 3. A current window 610 of audio samples is processed into a mix of temporal and spectral features used by the deep neural network 620 from which the output enhanced audio segment 630 is filtered and regenerated. The current window 610 of audio samples is proceeded in an audio signal by previous samples 612 and followed by future samples 614. For example, previous samples and/or future samples may be processed in previous or later windows in a sequence of windows of audio samples.

For example, an evaluation of the enhancement deep neural network may operate on an input span of 0.5 seconds to 2 seconds of noisy audio. This duration of the window creates an input audio context that spans multiple speech phonemes and even multiple words. By spanning more phonemes, the network has more contextual information to allow the model to capture statistically frequent sound and even word usage patterns in a target language. In addition, complex noise patterns can effectively be learned to assist in removal of these interferers. Together, the system may be enabled to disambiguate speech from noise more effectively and even partially reconstruct the more plausible missing speech sounds if they have been completely masked by noise. The system may operate on just the current input samples, and samples in the past, or may operate on current sample, and samples both before and after the current time. Looking ahead (e.g., by some hundreds of milliseconds) the accuracy can be improved, but also increases the latency of the processing system by the extent of look ahead.

FIG. 6B is an illustration of an example of audio enhancement processing 650 for overlapping windows of audio samples to generate overlapping enhanced audio segments. A current window N 660 of audio samples is processed into a mix of temporal and spectral features used by the deep neural network 670 from which the output enhanced audio segment 680 is filtered and regenerated. A previous window N−1 662 of audio samples is processed into a mix of temporal and spectral features used by the deep neural network 670 from which the output enhanced audio segment 682 is filtered and regenerated. A next window N+1 664 of audio samples is processed into a mix of temporal and spectral features used by the deep neural network 670 from which the output enhanced audio segment 684 is filtered and regenerated. The previous window N−1 662 of audio samples is proceeded in an audio signal by previous samples 666 and the next window N+1 664 is followed by future samples 668. For example, previous samples and/or future samples may be processed in previous or later windows in the sequence of windows of audio samples.

The deep neural network 670 is applied to overlapping input windows (660, 662, and 664) of audio samples. The input overlaps may be chosen to both provide sufficient context for speech reconstruction and to allow the output segments (680, 682, and 684) to overlap. For example, overlapping output windows may be combined by averaging the results sample by sample. Combining the overlapping enhanced audio segments may improve continuity with reduced audio artifacts in the enhanced speech output.

Figure 7:
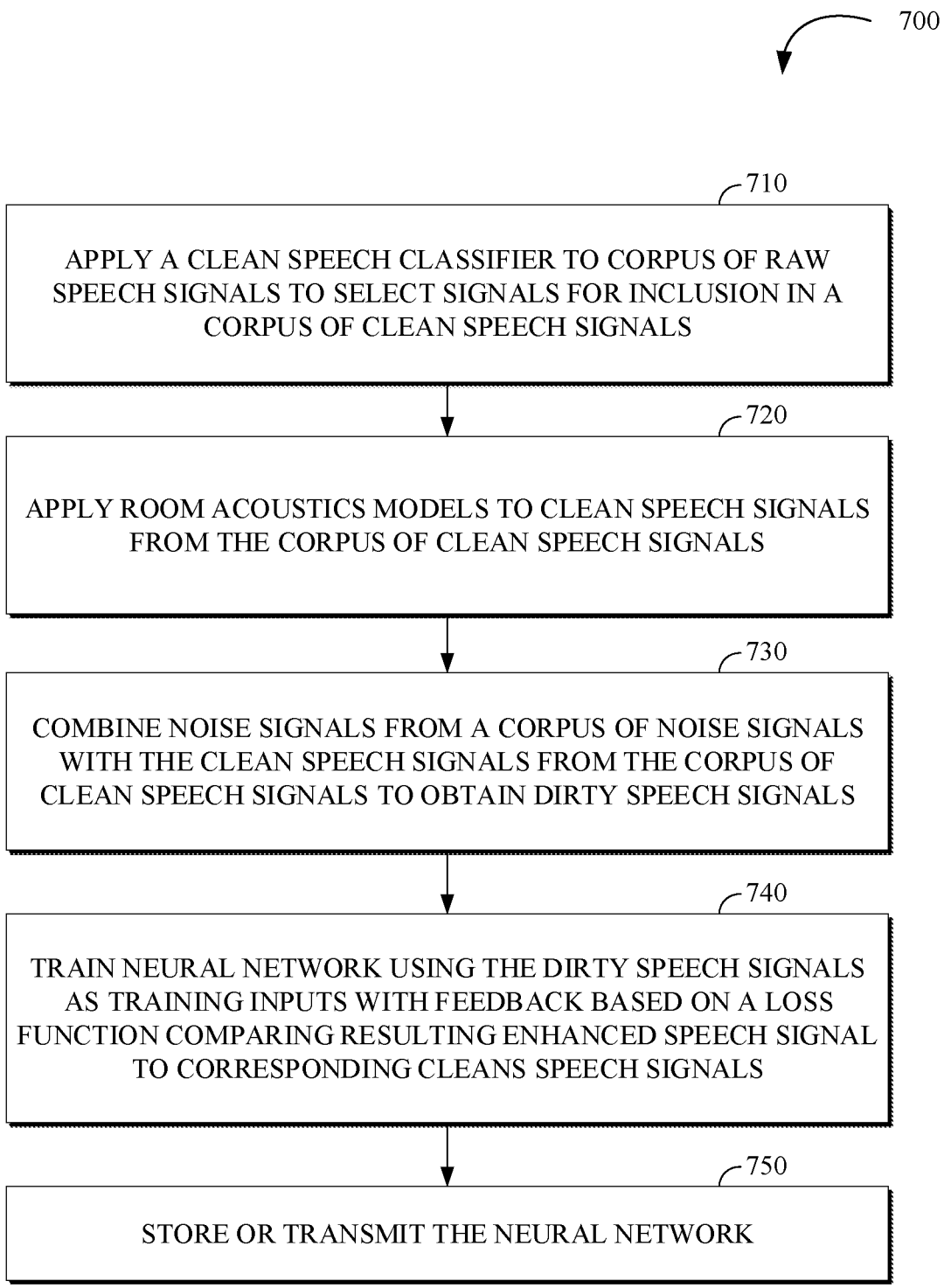
FIG. 7 is a flowchart of an example of a process for training a speech enhancement network.

FIG. 7 is a flowchart of an example of a process 700 for training a speech enhancement network. The process 700 includes applying 710 a clean speech classifier to classify raw speech signals from a corpus of raw speech signals to select raw speech signals for inclusion in the corpus of clean speech signals; applying 720 room acoustic models to clean speech signals from a corpus of clean speech signals to obtain dirty speech signals; combining 730 noise signals from a corpus of noise signals with the clean speech signals; training 740 the neural network using the dirty speech signals as training inputs; and storing or transmitting 750 the neural network. For example, the process 700 may be implemented by the system 200 of FIG. 2, the system 300 of FIG. 3A, the system 330 of FIG. 3B or the system 400 of FIG. 4. For example, the process 700 may be implemented by a video capture device, such as the video capture device 310 shown in FIG. 3A. For example, the process 700 may be implemented by a computing device, such as the personal computing device 360 or the computing device 430.

The process 700 includes applying 710 a clean speech classifier to classify raw speech signals from a corpus of raw speech signals to select raw speech signals for inclusion in the corpus of clean speech signals. For example, the clean speech classifier may include a neural network that is trained to distinguish between high quality speech recordings and low quality speech recordings (e.g., using a corpus of speech examples labeled manually). In some implementations, the clean speech classifier may be configured to determine one or more objective quality metrics (e.g. Perceptual Evaluation of Speech Quality (PESQ)) for the raw speech signals and select the raw speech signals for inclusion in the corpus of clean speech signals based on the one or more objective quality metrics (e.g., using one or more thresholds for the objective quality metrics).

The process 700 includes applying 720 room acoustic models to clean speech signals from a corpus of clean speech signals to obtain dirty speech signals. For example, a room acoustic model may be applied 720 to a clean speech signal using a convolution operation. For example thousands of different room acoustic models may be applied to the clean speech signals of the corpus of clean speech signals to generate a large augmented corpus of training signals, called dirty speech signals.

The process 700 includes combining 730 noise signals from a corpus of noise signals with the clean speech signals. For example, the noise may be combined with the speech by simple linear combination (additive noise) or may use a more complex combination function to represent the effects of microphone saturation or the Lombard effect. The noise signals may be collected from many sources for background noise (e.g., recordings from cafés, streets, construction sites, cars, airplanes, bars, and video and audio production sound effects). Common human-generated non-speech noises, such as laughter and applause may also be included in the noise corpus. In some implementations, a room acoustic model may be applied 720 separately to each of the speech and noise components, before combining these components, in order to approximate different speaker and noise source locations in the acoustic space. In some implementations, various other audio augmentations can be performed at this stage with parameters and probability of occurrence drawn from predefined distributions. These audio augmentations may include various linear and non-linear transformations (e.g., frequency shaping, time and/or frequency modulations, expansion or compression in time and/or amplitude, saturation, phase distortions, etc.). These maybe applied to individual sound sources prior to mixing, and/or to the final mixture (e.g., to simulate various effects of electroacoustic transducers utilized in consumer audio products, such as mobile phones). These audio augmentations may be applied in order to help improve robustness and generalization of data-driven audio algorithms to a wide range of real-life noisy/degraded audio stimuli.

In some implementations (not shown in FIG. 7), the noise signals may be combined 730 with the clean speech signals before the room acoustic models are applied 720 to the combined signals to obtain the dirty speech signals. This ordering of the training dataset augmentation operations may create realistic speech and noise interference mixes.

The process 700 includes training 740 the neural network using the dirty speech signals as training inputs with feedback based on a loss function comparing resulting enhanced audio signals to corresponding clean speech signals from the corpus of clean speech signals. For example, the loss function may include terms based on a mean square error (MSE) criterion, a MSE derived based on application of frequency dependent psychoacoustic weights, as well as various objective measures of speech quality and/or speech intelligibility, such as perceptual evaluation of speech quality (PESQ), perceptual objective listening quality assessment (POLQA), short-time objective intelligibility (STOI or extended STOI), normalized covariance measure (NCM), short-time speech-based transmission index (STI), etc. For example, the neural network may be trained 740 using a stochastic deepest descent algorithm.

The process 700 includes storing or transmitting 750 the neural network. For example, the neural network (e.g., the model or state of the neural network) may be transmitted 750 to an external device (e.g., a personal computing device) for display or storage. For example, the neural network may be stored 750 in memory of a processing apparatus (e.g., the processing apparatus 312, the processing apparatus 362, or the processing apparatus 432) for later use to enhance speech signals. For example, the neural network may be transmitted 750 via the communications interface 322, the communications interface 366, or the network communications interface 436.

Figure 8:
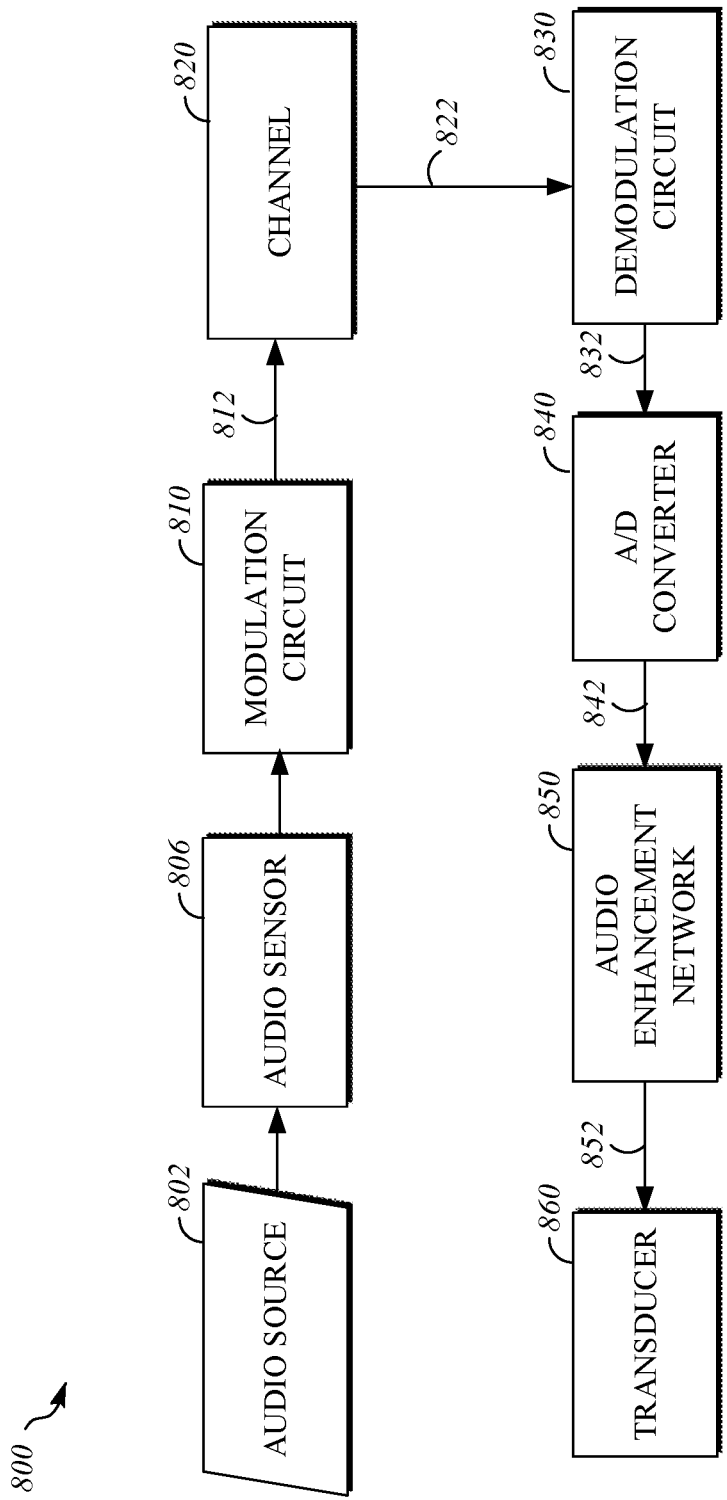
FIG. 8 is a block diagram of an example of a system for data driven radio enhancement.

FIG. 8 is a block diagram of an example of a system 800 for data driven radio enhancement. The system includes an audio sensor 806, a modulation circuit 810, a channel 820, a demodulation circuit 830, an analog-to-digital converter 840, an audio enhancement network 850, and a transducer 860.

An audio source signal 802 (e.g., speech of radio personality and/or music) is recorded by the audio sensor 806 (e.g., a microphone in a radio station studio) and input to the modulation circuit 810 to generate a radio signal 812 for broadcast. For example, the modulation circuit 810 may include an AM (amplitude modulation) modulator and/or an FM (frequency modulation) modulator tuned to a carrier frequency (e.g., in the 535-1605 kHz band or in the 88 to 108 MHz band).

The radio signal 812 transmitted through the channel 820, resulting in a radio signal 822 that may include noise and/or other distortion introduced by the channel 820. For example, the channel 820 may include a radio station antenna attached to the modulation circuit 810, a path through the air traversed by electromagnetic waves of the radio signal 812, and a radio receiver antenna (e.g., the antenna 1012) attached to the demodulation circuit 830.

The radio signal 822 is input to the demodulation circuit 830 to obtain a demodulated audio signal 832. For example, the demodulation circuit 830 may include an AM (amplitude modulation) demodulator and/or an FM (frequency modulation) demodulator tuned to the carrier frequency (e.g., in the 535-1605 kHz band or in the 88 to 108 MHz band). The demodulated audio signal is passed through the analog-to-digital converter 840 to obtain the demodulated audio signal 842 in a PCM (pulse-code modulation) format.

The audio enhancement network 850 is applied to the demodulated audio signal 842 to obtain an enhanced audio signal 852. In some implementations, the demodulated audio signal 842 is windowed and/or transformed to facilitate application of the audio enhancement network 850. For example, the demodulated audio signal 842 partitioned into consecutive windows of audio samples of a fixed duration (e.g., 1 second, 2 seconds, or 5 seconds) that are sequentially processed by the audio enhancement network 850 to obtain respective segments of the enhanced audio signal 852. In some implementations, windows of audio samples from the demodulated audio signal 842 partially overlap. For example, a window of audio samples may be transformed (e.g., using a Fast Fourier Transform (FFT) or a wavelet transform) and the resulting transform coefficients may be input with the samples of window of audio samples to the audio enhancement network. The audio enhancement network 850 includes a machine learning network that has been trained using demodulated audio signals derived from radio signals. For example, the audio enhancement network may have been trained by implementing the process 1200 of FIG. 12. For example, the machine learning network may include a neural network. For example, the machine learning network may include a convolutional neural network. For example, the machine learning network may include a deep neural network. For example, the machine learning network may include a network trained using swarm intelligence algorithm. For example, the machine learning network may include a network trained using an ant-colony optimization algorithm. For example, the machine learning network may include a network trained using a genetic algorithm. For example, the machine learning network may include a network trained using a simulated annealing algorithm.

The enhanced audio signal may be input to a transducer 860 (e.g., one or more speakers) for playback to a user. For example, the transducer 860 may include a digital-to-analog converter.

Figure 9:
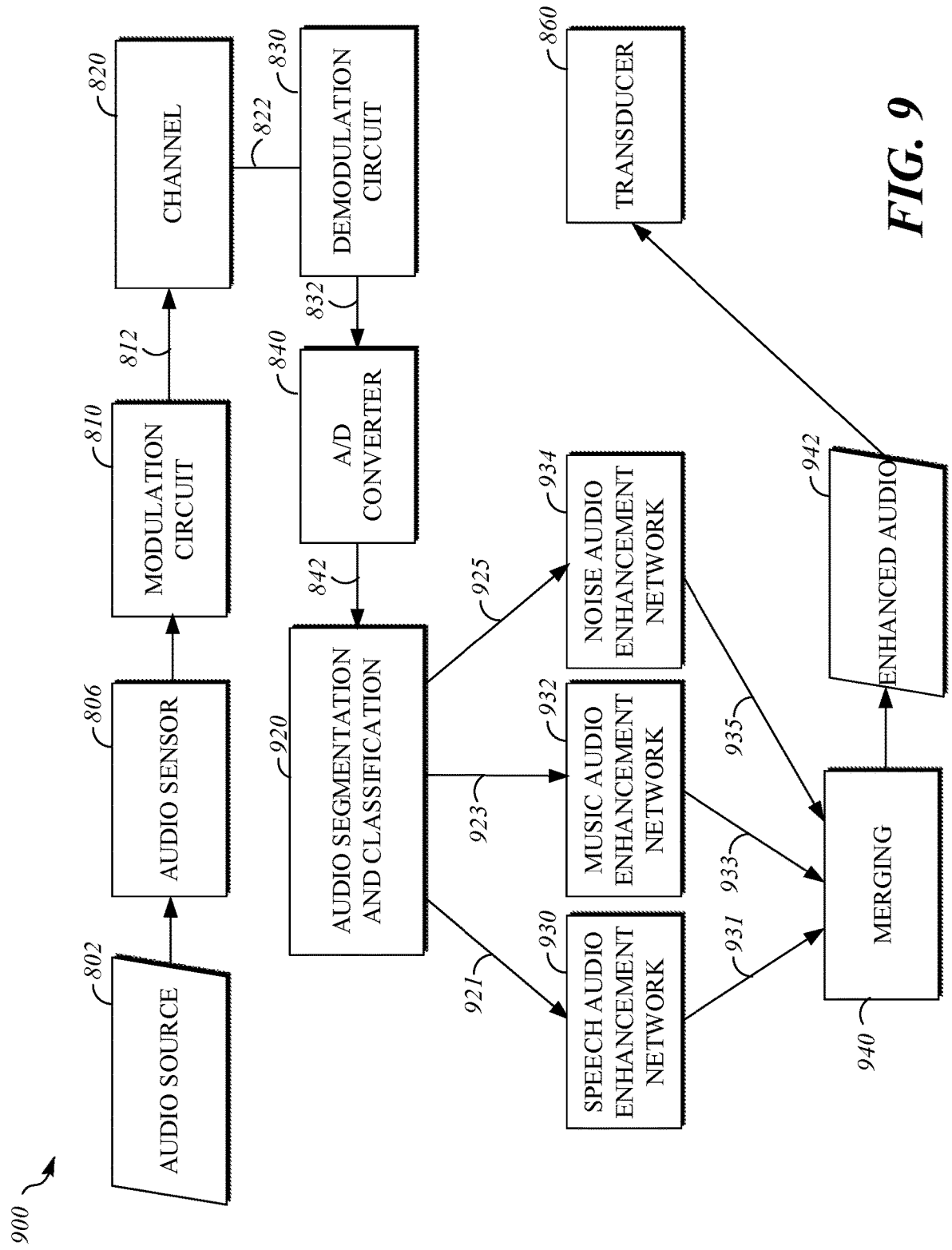
FIG. 9 is a block diagram of an example of a system for data driven radio enhancement.

FIG. 9 is a block diagram of an example of a system 900 for data driven radio enhancement. In this example, multiple audio enhancement networks that are trained with demodulated audio signals are used enhance audio of different respective types of source audio (e.g., speech, music, and noise). A classifier is used to classify windows of audio samples and one audio enhancement network from this set of audio enhancement networks is selected for application to the window of audio samples to obtain a resulting segment of enhanced audio. The system 900 includes the audio sensor 806, the modulation circuit 810, the channel 820, the demodulation circuit 830, the analog-to-digital converter 840, transducer 860 and associate signals (802, 812, 822, 832, and 842), which are the same as described in relation to the system 800 of FIG. 8. The system 900 includes an audio segmentation and classification module 920, a speech audio enhancement network 930, a music audio enhancement network 932, a noise audio enhancement network 934, and a merging module 940.

The system 900 includes an audio segmentation and classification module 920. For example, the audio segmentation and classification module 920 may be the same as the audio segmentation and classification module 120 of FIG. 1. The audio segmentation and classification module 920 may operate on the demodulated audio signal 842 to determine a sequence of windows of audio samples and classify windows of audio samples using a neural network based classifier to determine respective classifications of the type of audio (e.g., speech or music) in a window of audio samples from the demodulated audio signal 842. The classified windows of audio samples are then passed to one of the available audio enhancement networks (930, 932, or 934) that is selected based on the classification for the window of audio samples.

The system 900 includes a speech audio enhancement network 930 that may be trained to determine an enhanced speech segment 931 based on a window of audio samples 921 for which the speech audio enhancement network 930 has been selected based on a classification of the window of audio samples 921 determined by the audio segmentation and classification module 920. Speech enhancement may be a difficult and sophisticated audio enhancement method in the system 900. For example, the speech audio enhancement network 930 may be a learned system, using deep neural network structures trained on a wide variety of speech impaired noise and/or distortion from the channel 820, speech babble, music and acoustic reverberation to cover the wide range possible speech inputs. The training of the deep neural network may be key to its success in mapping noisy, reverberant speech into cleaner speech with less reverberation. For example, the process 1200 of FIG. 12 may be implemented to train a neural network of the speech audio enhancement network 930.

For example, a window of audio samples 921 may be processed into a mix of temporal and spectral features used by a deep neural network from which enhanced speech segment 931 is filtered and regenerated. For example, evaluation of the enhancement deep neural network may operate on an input span of 0.5 seconds to 2 seconds of noisy audio. This window duration may create an input audio context that spans multiple speech phonemes and even multiple words. By spanning more phonemes, the network may be provided sufficient contextual information to allow the model to capture statistically frequent sound and even word usage patterns in a target language. In addition, complex noise patterns can effectively be learned to assist in removal of these interferers. Together, the speech audio enhancement network 930 may disambiguate speech from noise more effectively and even partially reconstruct the more plausible missing speech sounds if they have been completely masked by noise. The speech audio enhancement network 930 may operate on just the current input samples, and samples in the past, or may operate on current sample, and samples both before and after the current time. Looking "ahead" by some hundreds of milliseconds the accuracy can be improved, but this technique may increase the latency of the system 900 by the extent of look ahead. In some implementations, a deep neural network of the speech audio enhancement network 930 is applied to overlapping input audio segments. For example, a deep neural network may be applied as illustrated by FIG. 6B. The input overlaps may be chosen to both provide sufficient context for speech reconstruction and to allow the output windows to overlap. For example, overlapping output windows may be combined by averaging (e.g., using a weighted average) the results sample by sample. This technique may increase continuity and reduce audio artifacts in the enhanced speech segment 931.

The system 900 includes a music audio enhancement network 932 that may be trained to determine an enhanced music segment 933 based on a window of audio samples 923 for which the music audio enhancement network 932 has been selected based on a classification of the window of audio samples 923 determined by the audio segmentation and classification module 920. Music enhancement may follow a similar strategy and structure as speech enhancement, but where the goal is to remove interfering background speech and noise and/or distortion from the channel 820 from dominant music content. For example, the process 1200 of FIG. 12 may be implemented to train a neural network of the speech audio enhancement network 930.

The system 900 includes a noise audio enhancement network 934 that may be trained to determine an enhanced noise segment 935 based on a window of audio samples 925 for which the noise audio enhancement network 934 has been selected based on a classification of the window of audio samples 925 determined by the audio segmentation and classification module 920. For example, the noise audio enhancement network 934 may be configured to suppress a noisy portion of the demodulated audio signal 842 by scaling the signal down. In some implementations, the noise audio enhancement network 934 may pass an enhanced noise segment 935 with little or no modification of corresponding samples from the window of audio samples 925 in order to avoid introducing additional distortion.

The system 900 includes a merging module 940 that may be configured to combine the enhanced audio segments from the audio enhancement networks (930, 932, and 934) into one or more audio tracks constituting an enhanced audio signal 942. The enhanced audio signal 942 may then be input to a transducer 860 (e.g., one or more speakers) for playback to a user. For example, the transducer 860 may include a digital-to-analog converter.

Figure 10:
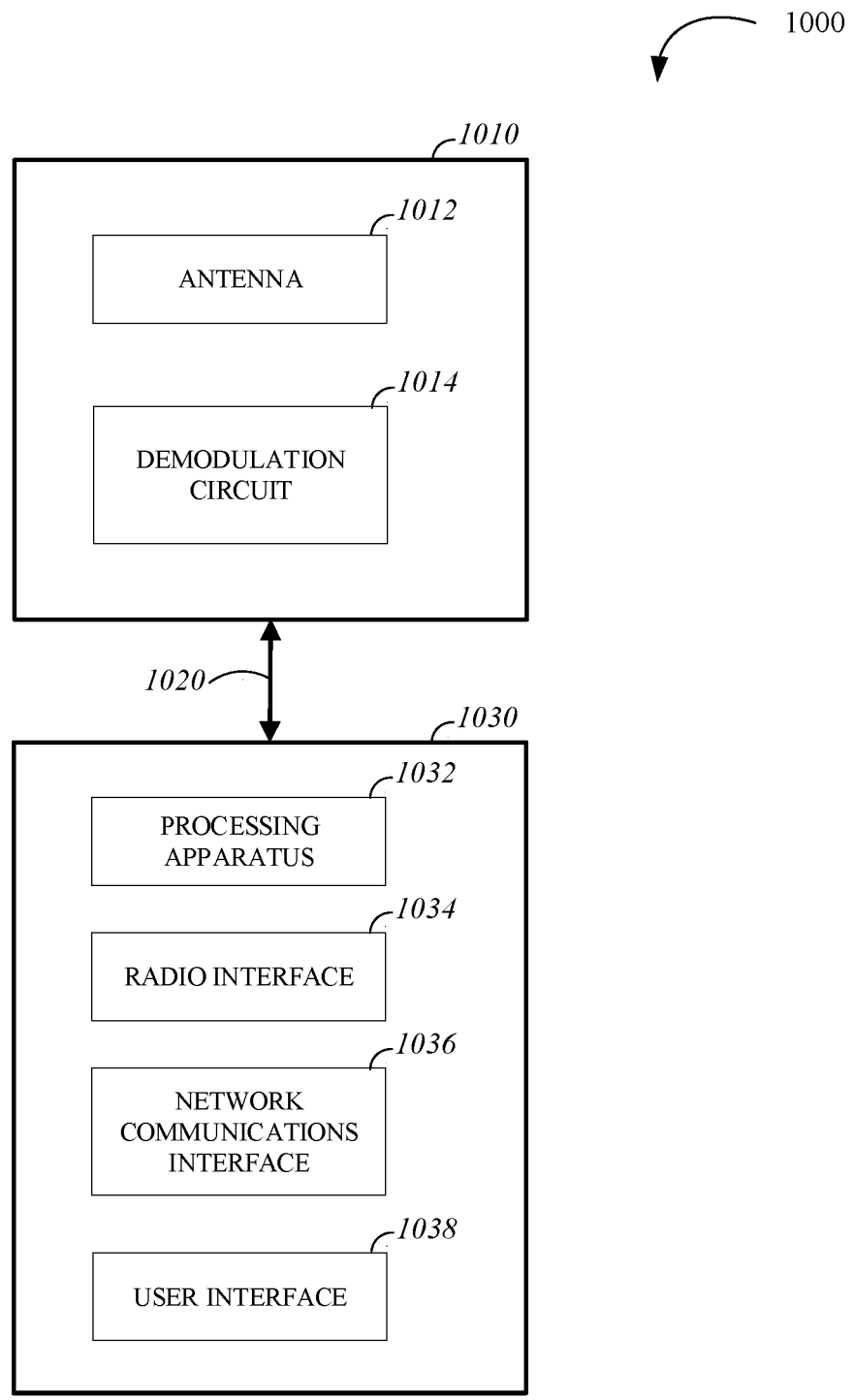
FIG. 10 is a block diagram of an example of a system configured for data driven radio enhancement.

FIG. 10 is a block diagram of an example of a system 1000 configured for data driven radio enhancement. The system 1000 includes a radio receiver 1010 that receives and demodulates radio frequency transmissions. The radio receiver 1010 includes an antenna 1012 and a demodulation circuit 1014. The system 1000 includes a computing device 1030 that is configured to provide an audio enhancement service for demodulated audio signals (e.g., audio signals demodulated from radio signals that may include speech and/or music). The computing device 1030 includes a processing apparatus 1032, a radio interface 1034, a network communications interface 1036, and a user interface 1038. The computing device 1030 may communicate with the radio receiver 1010 via a radio interface link 1020. The processing apparatus 1032 may be configured to apply audio enhancement processing to demodulated audio signals received by the radio receiver 1010 to enhance audio on demand for presentation via a speaker (e.g., the audio enhancement may be integrated with a local audio playback function). For example, the system 1000 may be used to implement processes described in this disclosure, such as the process 1100 of FIG. 11 and/or the process 1200 of FIG. 12.

The radio receiver 1010 includes an antenna 1012. The antenna may be configured for the reception of AM (amplitude modulated) and/or FM (frequency modulated) radio station signals (e.g., in the 535-1605 kHz band or in the 88 to 108 MHz band). For example, the antenna may be a quarter-wave whip antenna.

The radio receiver 1010 includes a demodulation circuit 1014. For example, the demodulation circuit 1014 may be configured to demodulate AM (amplitude modulated) and/or FM (frequency modulated) radio signals to obtain demodulated audio signals (e.g., including speech and/or music).

The computing device 1030 includes a processing apparatus 1032. The processing apparatus 1032 may include one or more processors having single or multiple processing cores. The processing apparatus 1032 may include memory, such as a random-access memory (RAM) device, flash memory, or any other suitable type of storage device, such as a non-transitory computer readable memory. The memory of the processing apparatus 1032 may include executable instructions and data that can be accessed by one or more processors of the processing apparatus 1032. For example, the processing apparatus 1032 may include one or more DRAM modules, such as double data rate synchronous dynamic random-access memory (DDR SDRAM). In some implementations, the processing apparatus 1032 may include a graphical processing unit (GPU). In some implementations, the processing apparatus 1032 may include a digital signal processor (DSP). In some implementations, the processing apparatus 1032 may include an application specific integrated circuit (ASIC).

The processing apparatus 1032 may include an audio enhancement network (e.g., the audio enhancement network 850) configured to reduce noise and distortion of demodulated audio signals received by the radio receiver 1010. In some implementations, the processing apparatus 1032 may include an audio classifier and multiple audio enhancement networks (e.g., the speech audio enhancement network 930 and/or the music audio enhancement network 932) configured to reduce noise and distortion of demodulated audio signals received by the radio receiver 1010. For example, one or more audio enhancement networks and/or the audio classifier may be implemented by software executed by the processing apparatus 1032. The processing apparatus 1032 may be configured to access a demodulated audio signal that is based on a demodulated radio signal; determine a window of audio samples based on the demodulated audio signal; apply an audio enhancement network to the window of audio samples to obtain an enhanced audio segment, in which the audio enhancement network includes a machine learning network that has been trained using demodulated audio signals derived from radio signals; and store, play, or transmit an enhanced audio signal based on the enhanced audio segment. In some implementations, the processing apparatus 1032 may be configured to access a training demodulated audio signal that is based on a demodulated radio signal; receive a streamed audio signal corresponding to the radio signal; determine a training window of audio samples based on the training demodulated audio signal; determine, based on the streamed audio signal, a ground truth window of audio samples corresponding to the training window of audio samples; and train the audio enhancement network using the training window of audio samples as a training input with feedback based on a loss function comparing a resulting enhanced audio segment to the ground truth window of audio samples. For example, the processing apparatus 1032 may be configured to determine cross-correlations between the training demodulated audio signal and the streamed audio signal; and resample, based on the cross-correlations, the streamed audio signal to align samples of the ground truth window of audio samples with the training window of audio samples. For example, the processing apparatus 1032 may be configured to determine cross-correlations between the training demodulated audio signal and the streamed audio signal; based on the cross-correlations, identify portions of the training demodulated audio signal and the streamed audio signal that are mismatched portions; and omit samples based on the mismatched portions of the training demodulated audio signal and the streamed audio signal from the training window of audio samples and the ground truth window of audio samples respectively. For example, the processing apparatus 1032 may be configured to input the window of audio samples to a classifier to obtain a classification, in which the classifier includes a neural network and the classification takes a value from a set of multiple classes of audio; and select, based on the classification, the audio enhancement network from a set of multiple audio enhancement networks, in which the audio enhancement network includes a neural network that has been trained using demodulated audio signals of a type associated with the classification. For example, the set of multiple classes of audio includes a speech class and a music class, and the set of multiple audio enhancement networks includes a speech enhancement network and a music enhancement network. For example, the processing apparatus 1032 may be configured to determine a sequence of partially overlapping windows of audio samples, including the window of audio samples, based on the demodulated audio signal; determine a sequence of respective enhanced audio segments, including the enhanced audio segment, based on the sequence of partially overlapping windows of audio samples using the audio enhancement network; and determine an enhanced audio signal by blending the sequence of respective enhanced audio segments, including combining corresponding samples from multiple segments in overlapping portions of the enhanced audio segments. For example, the audio enhancement network may include a convolutional neural network.

The computing device 1030 includes a radio interface 1034. For example, the radio interface 1034 may include a port (e.g., a USB port) or antenna for receiving demodulated audio signals from the radio receiver 1010. In some implementations, the radio interface 1034 includes an analog-to-digital converter and the demodulated audio signal is transferred as an analog signal over a cable (e.g., a RCA cable) of the radio interface link 1020 before being sampled and quantized by the analog-to-digital converter. In some implementations, the radio receiver 1010 includes an analog-to-digital converter and the demodulated audio signal is transferred across the radio interface link 1020 in digital format. For example, the radio interface 1034 may include a serial port (e.g., a USB port) or a specialized wired or wireless digital audio port.

The computing device 1030 includes a network communications interface 1036. The network communications interface 1036 may enable access to streaming audio signals corresponding to demodulated audio signals. For example, the network communications interface 1036 may implement one or more network communications protocols (e.g., Ethernet, WiFi, SONET, IPv4 and/or IPv6 protocols). In some implementations, after a demodulated audio signal has been enhanced by the processing apparatus (e.g., by implementing the process 1100 of FIG. 11), the resulting enhanced audio signal may be transmitted via the network communications interface 1036 to another device for storage and/or playback.

The computing device 1030 includes a user interface 1038. For example, the user interface 1038 may include a touchscreen display and one or more speakers (e.g., headphones) for presenting video and/or messages to a user and receiving commands from a user. For example, the user interface 1038 may include a speaker configured to play the enhanced audio signal. In some implementations, one or more speakers of the user interface 1038 are used to play an enhanced audio signal generated by the processing apparatus 1032 as part of an integrated audio enhancement and playback function.

Figure 11:
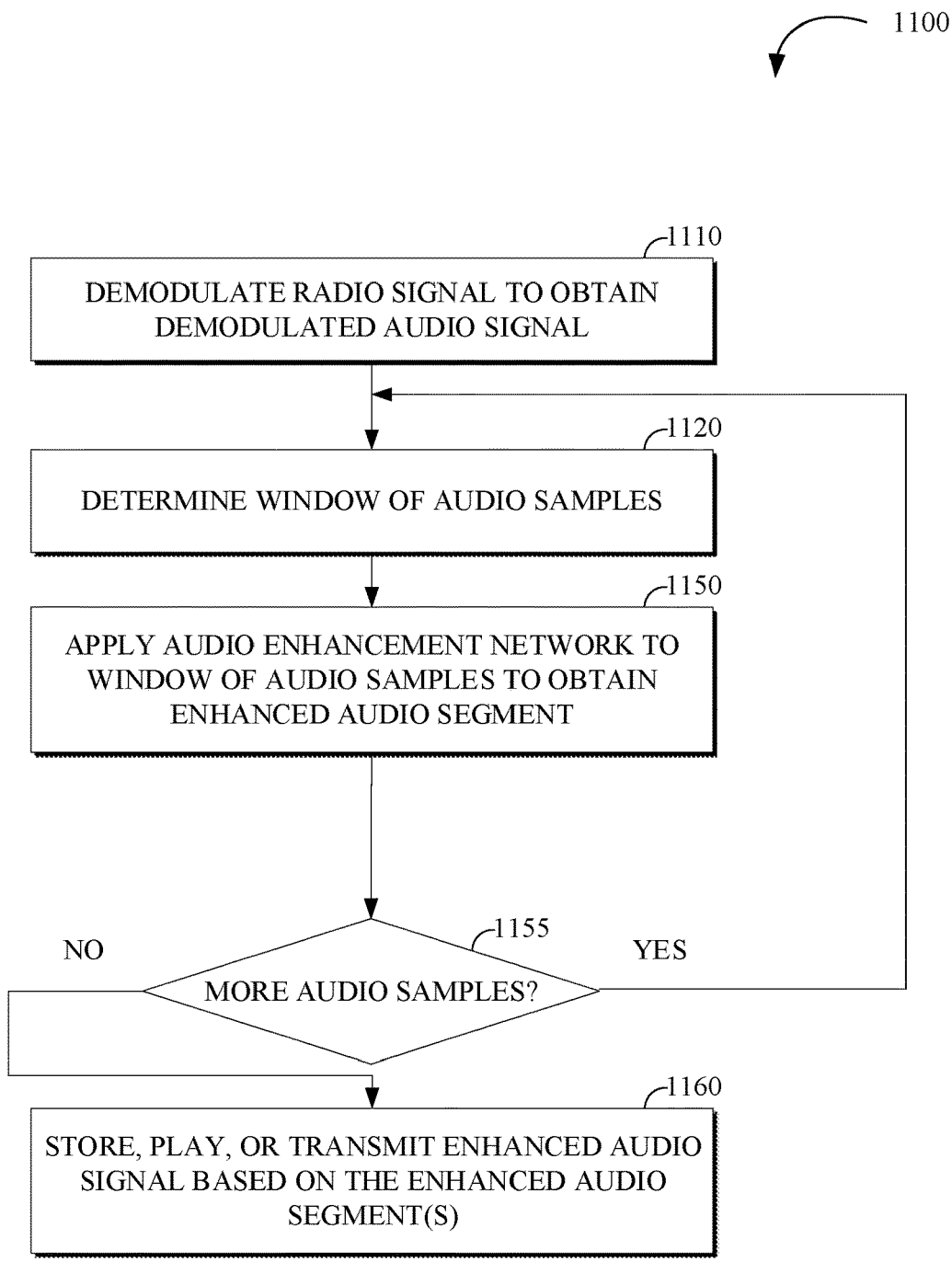
FIG. 11 is a flowchart of an example of a process for data driven radio enhancement.

FIG. 11 is a flowchart of an example of a process 1100 for data driven radio enhancement. The process includes demodulating 1110 a radio signal to obtain a demodulated audio signal; determining 1120 a window of audio samples based on the demodulated audio signal; applying 1150 an audio enhancement network to the window of audio samples to obtain an enhanced audio segment, in which the audio enhancement network includes a machine learning network that has been trained using demodulated audio signals derived from radio signals; and storing, playing, or transmitting 1160 an enhanced audio signal based on the enhanced audio segment. For example, the process 1100 may be implemented by the system 800 of FIG. 8, the system 900 of FIG. 9, or the system 1000 of FIG. 10. For example, the process 1100 may be implemented by a computing device, such as the computing device 1030 shown in FIG. 10.

The process 1100 includes demodulating 1110 a radio signal to obtain a demodulated audio signal. For example, an AM (amplitude modulation) or FM (frequency modulation) radio receiver may be used to demodulate 1110 the radio signal to obtain the demodulated audio signal. For example, the demodulation circuit 830 may be used to demodulate 1110 the radio signal to obtain the demodulated audio signal. In some implementations, the demodulated audio signal that is based on a demodulated radio signal may be accessed by a processing apparatus (e.g., including a processor) for radio enhancement processing. For example, the demodulated audio signal may be accessed via a radio interface (e.g., the radio interface 1034). For example, the demodulated audio signal may be encoded and/or stored as a pulse-code modulated (PCM) signal.

The process 1100 includes determining 1120 a window of audio samples based on the demodulated audio signal. For example, the duration of the window of audio samples may be fixed and may correspond to the size of an input layer of an audio enhancement network. The duration (e.g., 1 second, 2 seconds, or 5 seconds) of the window of audio samples may be chosen to span multiple phonemes or words in a target language of speech to provide sufficient context for classification and/or audio enhancement processing. The duration of the window of audio samples may be chosen to be short enough to track fast changes in the type(s) of audio signals present in the demodulated audio signal. In some implementations, the window of audio samples is of a longer duration than a corresponding enhanced audio segment that will be generated based on the window of audio samples. For example, the window of audio samples may extend before and/or after the endpoints of the corresponding enhanced audio segment in order to provide look-back and/or look-ahead information to an audio enhancement network that is used to obtain the enhanced audio segment. For example, the window of audio samples may be determined as described in relation to the current window 610 of audio samples of FIG. 6A. In some implementations, determining 1120 the window of audio samples is part of determining 1120 a sequence of partially overlapping windows of audio samples, including the window of audio samples, based on the demodulated audio signal. For example, a sequence of partially overlapping windows of audio samples may be determined 1120 as described in relation to the window N 660, the window N−1 662, and the window N+1 664 of FIG. 6B. In some implementations, determining 1120 a window of audio samples includes iteratively shifting the phase of a window of audio samples that is input to a classifier to search for more precise boundaries or transition times in the audio type classification and selecting the phase of one or more windows of audio samples based on a time offset of a detected transition in a classification of the audio type.

The process 1100 includes applying 1150 an audio enhancement network to the window of audio samples to obtain an enhanced audio segment. The audio enhancement network includes a machine learning network that has been trained using demodulated audio signals derived from radio signals. For example, the audio enhancement network may have been trained by implementing the process 1200 of FIG. 12. For example, the machine learning network may include a neural network. For example, the machine learning network may include a convolutional neural network. For example, the machine learning network may include a deep neural network. For example, the machine learning network may include a network trained using swarm intelligence algorithm. For example, the machine learning network may include a network trained using an ant-colony optimization algorithm. For example, the machine learning network may include a network trained using a genetic algorithm. For example, the machine learning network may include a network trained using a simulated annealing algorithm. In some implementations, the window of audio samples is transformed (e.g., using a Fast Fourier Transform (FFT) or a wavelet transform) and the resulting transform coefficients are input with the samples of window of audio samples to the audio enhancement network.

In some implementations, the audio enhancement network may be one of a set of multiple audio networks that have been trained with demodulated audio signals of different respective audio types (e.g., speech or music). For example, the techniques described in relation to the system 100 of FIG. 1 and the process 500 of FIG. 5 may be applied to demodulated audio signals instead of audio extracted from AV files. For example, the window of audio samples may be input to a classifier to obtain a classification. The classifier may include a neural network and the classification may take a value from a set of multiple classes of audio (e.g., speech or music). For example, the audio enhancement network may be selected, based on the classification, from a set of multiple audio enhancement networks, in which the audio enhancement network includes a neural network that has been trained using demodulated audio signals of a type (e.g., speech or music) associated with the classification. In some implementations, the set of multiple classes of audio includes a speech class and a music class, and the set of multiple audio enhancement networks includes a speech enhancement network (e.g., the speech audio enhancement network 930) and a music enhancement network (e.g., the music audio enhancement network 932).

If (at operation 1155) there are more audio samples from the demodulated audio signal to be processed, then a next window of audio samples is determined 1120 and the audio enhancement network is applied 1150 to the next window of audio samples to obtain a next enhanced audio segment. The process 1100 may continue iteratively until (at operation 1155) there are no more windows of audio samples to be processed. For example, the process 1100 may include determining a sequence of respective enhanced audio segments, including the enhanced audio segment, based on the sequence of partially overlapping windows of audio samples (e.g., as illustrated in FIG. 6B) using the audio enhancement network.

The process 1100 includes storing, playing, or transmitting 1160 an enhanced audio signal based on the enhanced audio segment. For example, determining the enhanced audio signal may include blending the sequence of respective enhanced audio segments, including combining (e.g., using weighted averaging) corresponding samples from multiple segments in overlapping portions of the enhanced audio segments. For example, the enhanced audio signal may be stored 1160 (e.g., in a PCM format or in a compressed format) in memory of the processing apparatus 1032. For example, the enhanced audio signal may be played 1160 using the transducer 860 or a speaker of the user interface 1038. For example, the enhanced audio signal may be transmitted 1160 via the network communications interface 1036 to another device for storage or playback.

Figure 12:
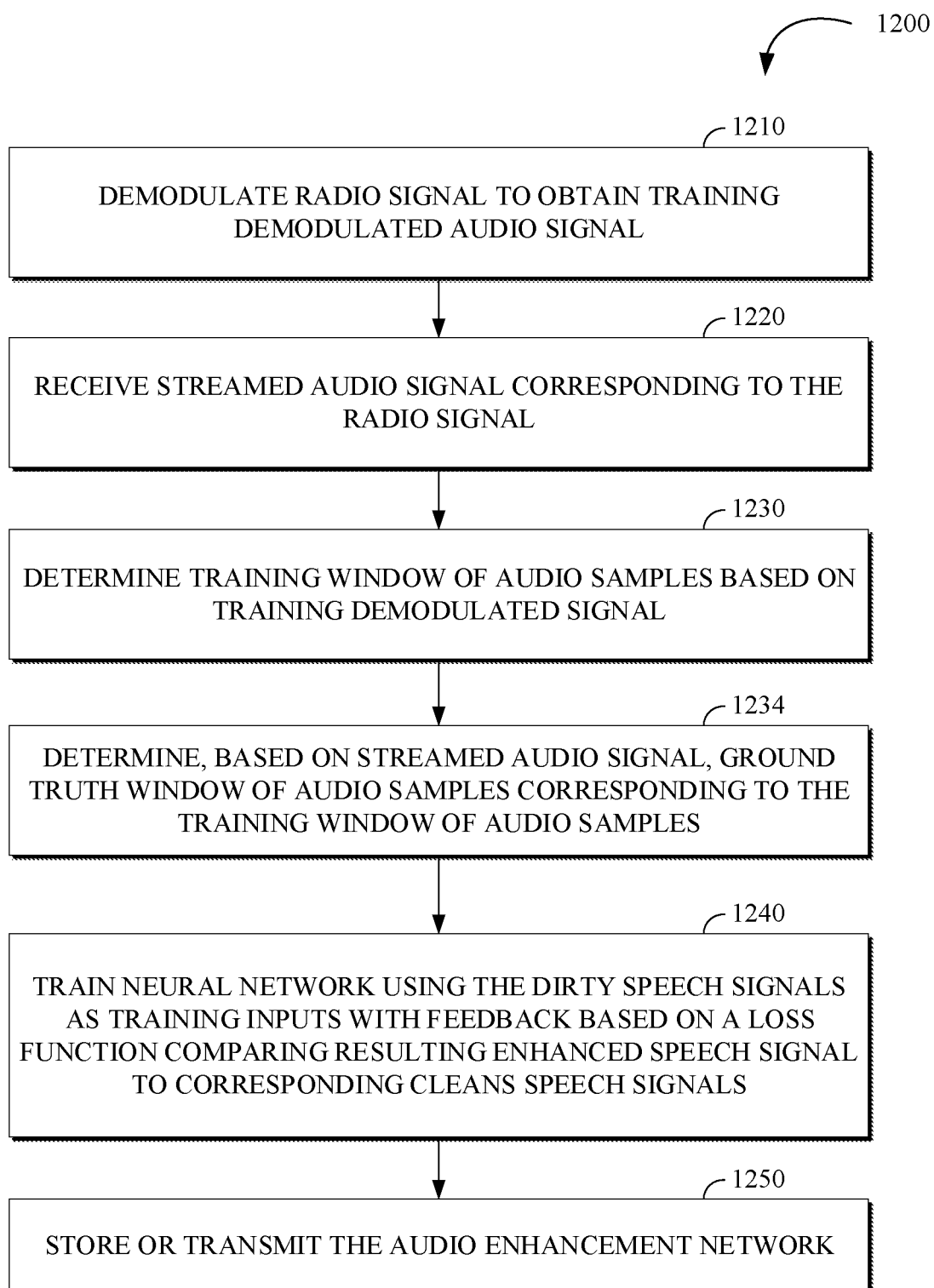
FIG. 12 is a flowchart of an example of a process for training an audio enhancement network using demodulated radio signals.

FIG. 12 is a flowchart of an example of a process 1200 for training an audio enhancement network using demodulated radio signals. For example, audio enhancement network may be trained in the field using demodulated radio signals to adapt the audio enhancement network to a communications channel including the modulation and transmission facilities of a particular radio station in an area, and/or a particular radio receiver (e.g., the radio receiver 1010). The process 1200 includes demodulating 1210 a radio signal to obtain a training demodulated audio signal; receiving 1220 a streamed audio signal corresponding to the radio signal; determining 1230 a training window of audio samples based on the training demodulated audio signal; determining 1234, based on the streamed audio signal, a ground truth window of audio samples corresponding to the training window of audio samples; training 1240 the audio enhancement network using the training window of audio samples as a training input with feedback based on a loss function comparing a resulting enhanced audio segment to the ground truth window of audio samples; and storing or transmitting 1250 the audio enhancement network. For example, the process 1100 may be implemented by the system 800 of FIG. 8, the system 900 of FIG. 9, or the system 1000 of FIG. 10. For example, the process 1100 may be implemented by a computing device, such as the computing device 1030 shown in FIG. 10.

The process 1200 includes demodulating 1210 a radio signal to obtain a training demodulated audio signal. For example, an AM (amplitude modulation) or FM (frequency modulation) radio receiver may be used to demodulate 1210 the radio signal to obtain the training demodulated audio signal. For example, the demodulation circuit 830 may be used to demodulate 1210 the radio signal to obtain the training demodulated audio signal. In some implementations, the training demodulated audio signal that is based on a demodulated radio signal may be accessed by a processing apparatus (e.g., including a processor) for network training operations. For example, the training demodulated audio signal may be accessed via a radio interface (e.g., the radio interface 1034). For example, the training demodulated audio signal may be accessed by reading the training demodulated audio signal from memory (e.g., memory of the processing apparatus 1032). For example, the training demodulated audio signal may be encoded and/or stored as a pulse-code modulated (PCM) signal.

The process 1200 includes receiving 1220 a streamed audio signal corresponding to the radio signal. For example, a radio station may distribute their audio content via multiple channels including by radio frequency broadcast and a streaming audio service accessible over a communications network, such as the Internet. For example, the source audio (e.g., speech and/or music) that is broadcast via radio transmissions may also be digitized, packetized, and streamed over an packet network to listeners using a streaming audio service. The streamed audio signal may be immune to some noise and/or distortion introduced to the source audio during radio frequency transmission, and may thus serve as a good reference signal for training a machine learning network to reject these types of noise and/or distortion. For example, the streamed audio signal may be received 1220 via a communication network (e.g., using the network communications interface 1036). In some implementations, the streamed audio signal may be decoded and/or stored until it is time to train an audio enhancement network with a batch of accumulated training data. For example, the streamed audio signal may be encoded and/or stored as a pulse-code modulated (PCM) signal.

The process 1200 includes determining 1230 a training window of audio samples based on the training demodulated audio signal. For example, the duration of the training window of audio samples may be fixed and may correspond to the size of an input layer of an audio enhancement network. The duration (e.g., 1 second, 2 seconds, or 5 seconds) of the training window of audio samples may be chosen to span multiple phonemes or words in a target language of speech to provide sufficient context for classification and/or audio enhancement processing. The duration of the training window of audio samples may be chosen to be short enough to track fast changes in the type(s) of audio signals present in the training demodulated audio signal. In some implementations, the training window of audio samples is of a longer duration than a corresponding enhanced audio segment that will be generated based on the training window of audio samples. For example, the training window of audio samples may extend before and/or after the endpoints of the corresponding enhanced audio segment in order to provide look-back and/or look-ahead information to an audio enhancement network that is used to obtain the enhanced audio segment. For example, the training window of audio samples may be determined as described in relation to the current window 610 of audio samples of FIG. 6A. In some implementations, determining 1230 the training window of audio samples is part of determining 1230 a sequence of partially overlapping training windows of audio samples, including the training window of audio samples, based on the training demodulated audio signal. For example, a sequence of partially overlapping windows of audio samples may be determined 1230 as described in relation to the window N 660, the window N−1 662, and the window N+1 664 of FIG. 6B. In some implementations, determining 1230 a training window of audio samples includes iteratively shifting the phase of a window of audio samples that is input to a classifier to search for more precise boundaries or transition times in the audio type classification and selecting the phase of one or more training windows of audio samples based on a time offset of a detected transition in a classification of the audio type. The process 1200 includes determining 1234, based on the streamed audio signal, a ground truth window of audio samples corresponding to the training window of audio samples. For example, the streamed audio signal may be sampled with a different sampling frequency (e.g., due to using different clocking crystals) than the training demodulated audio signal, which may cause drift in the synchronization of the two signals over time. Also, the sampling frequencies may vary over time. In some implementations, determining 1234 the ground truth window of audio samples includes resampling the streamed audio signal to sample align corresponding windows of samples from the two signals. For example, determining 1234 the ground truth window of audio samples may include determining cross-correlations between the training demodulated audio signal and the streamed audio signal; and resampling, based on the cross-correlations, the streamed audio signal to align samples of the ground truth window of audio samples with the training window of audio samples. For example, resampling the streamed audio signal to match the sampling frequency of the training window of audio samples may enable simultaneous alignment of all the samples of the window and/or may enable aligning time shifts that are fractions of a sample period. Even if the sampling frequencies are the same, there a time shift may exist between the streamed audio signal and the training window of audio samples (e.g., the radio version might be on a five second delay), which may be compensated for by applying a time shift to the streamed audio signal. In some implementations, determining the ground truth window of audio samples corresponding to the training window of audio samples includes determining cross-correlations between the training demodulated audio signal and the streamed audio signal; based on the cross-correlations, determining a time shift between the training demodulated audio signal and the streamed audio signal; and applying the time shift to the streamed audio signal to align samples of the ground truth window of audio samples with the training window of audio samples.

For example, portions of the source audio for the training demodulated audio signal and the streamed audio signal because of, for example, dropped packets and/or the insertion of different advertisements in the stream audio signal versus the corresponding radio signal from which the training demodulated audio signal is derived. In some implementations, determining 1234 the ground truth window of audio samples includes identifying and removing unmatched portions of the two corresponding signals. For example, determining 1230 a training window of audio samples and determining 1234 the ground truth window of audio samples may include determining cross-correlations between the training demodulated audio signal and the streamed audio signal; based on the cross-correlations, identifying portions of the training demodulated audio signal and the streamed audio signal that are mismatched portions; and omitting samples based on the mismatched portions of the training demodulated audio signal and the streamed audio signal from the training window of audio samples and the ground truth window of audio samples respectively.

The process 1200 includes training 1240 the audio enhancement network using the training window of audio samples as a training input with feedback based on a loss function comparing a resulting enhanced audio segment to the ground truth window of audio samples. For example, the loss function may include terms based on a mean square error (MSE) criterion, a MSE derived based on application of frequency dependent psychoacoustic weights, as well as various objective measures of speech quality and/or speech intelligibility, such as perceptual evaluation of speech quality (PESQ), perceptual objective listening quality assessment (POLQA), short-time objective intelligibility (STOI or extended STOI), normalized covariance measure (NCM), short-time speech-based transmission index (STI), etc. For example, the audio enhancement network may be trained 1240 using a stochastic deepest descent algorithm.

The process 1200 includes storing or transmitting 1250 the audio enhancement network. For example, the audio enhancement network (e.g., the model or state of the audio enhancement network) may be transmitted 1250 to an external device (e.g., a personal computing device) for display or storage. For example, the audio enhancement network may be stored 1250 in memory of a processing apparatus (e.g., the processing apparatus 1032) for later use to enhance demodulated audio signals. For example, the audio enhancement network may be transmitted 1250 via the network communications interface 1036.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. For example, a non-transitory computer-readable storage medium may include executable instructions that, when executed by a processor, facilitate performance of operations (e.g. operations of the process 1100 of FIG. 11 or the process 1200 of FIG. 12).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A system comprising:
    a processing apparatus that is configured to:
        access a demodulated audio signal that is based on a demodulated analog radio signal;
        determine a window of audio samples based on the demodulated audio signal;
        apply an audio enhancement network to the window of audio samples to obtain an enhanced audio segment, in which the audio enhancement network includes a machine learning network that has been trained using demodulated audio signals derived from analog radio signals to take the window of audio samples, in a pulse-code modulated format, as input and output the enhanced audio segment, in a pulse-code modulated format, such that power of an electromagnetic atmospheric noise present in the window of audio samples is reduced in the enhanced audio segment; and
        store, play, or transmit an enhanced audio signal based on the enhanced audio segment.

2. The system of claim 1, in which the processing apparatus is configured to:
    access a training demodulated audio signal that is based on a demodulated radio signal;
    receive a streamed audio signal corresponding to the radio signal;
    determine a training window of audio samples based on the training demodulated audio signal;
    determine, based on the streamed audio signal, a ground truth window of audio samples corresponding to the training window of audio samples; and
    train the audio enhancement network using the training window of audio samples as a training input with feedback based on a loss function comparing a resulting enhanced audio segment to the ground truth window of audio samples.

3. The system of claim 2, in which determining, based on the streamed audio signal, the ground truth window of audio samples corresponding to the training window of audio samples comprises:
    determining cross-correlations between the training demodulated audio signal and the streamed audio signal; and
    resampling, based on the cross-correlations, the streamed audio signal to align samples of the ground truth window of audio samples with the training window of audio samples.

4. The system of claim 2, in which determining the training window of audio samples based on the training demodulated audio signal, and determining, based on the streamed audio signal, the ground truth window of audio samples corresponding to the training window of audio samples comprises:
  determining cross-correlations between the training demodulated audio signal and the streamed audio signal;
  based on the cross-correlations, identifying portions of the training demodulated audio signal and the streamed audio signal that are mismatched portions; and
  omitting samples based on the mismatched portions of the training demodulated audio signal and the streamed audio signal from the training window of audio samples and the ground truth window of audio samples respectively.

5. The system of claim 2, in which determining, based on the streamed audio signal, the ground truth window of audio samples corresponding to the training window of audio samples comprises:
  determining cross-correlations between the training demodulated audio signal and the streamed audio signal;
  based on the cross-correlations, determining a time shift between the training demodulated audio signal and the streamed audio signal; and
  applying the time shift to the streamed audio signal to align samples of the ground truth window of audio samples with the training window of audio samples.

6. The system of claim 1, in which the processing apparatus is configured to:
  input the window of audio samples to a classifier to obtain a classification, in which the classifier includes a neural network and the classification takes a value from a set of multiple classes of audio; and
  select, based on the classification, the audio enhancement network from a set of multiple audio enhancement networks, in which the audio enhancement network includes a neural network that has been trained using demodulated audio signals of a type associated with the classification.

7. The system of claim 6, in which the set of multiple classes of audio includes a speech class and a music class, and the set of multiple audio enhancement networks includes a speech enhancement network and a music enhancement network.

8. The system of claim 1, in which the processing apparatus is configured to:
  determine a sequence of partially overlapping windows of audio samples, including the window of audio samples, based on the demodulated audio signal;
  determine a sequence of respective enhanced audio segments, including the enhanced audio segment, based on the sequence of partially overlapping windows of audio samples using the audio enhancement network; and
  determine an enhanced audio signal by blending the sequence of respective enhanced audio segments, including combining corresponding samples from multiple segments in overlapping portions of the enhanced audio segments.

9. The system of claim 1, in which the audio enhancement network includes a convolutional neural network.

10. The system of claim 1, comprising:
  a speaker configured to play the enhanced audio signal.

11. A method comprising:
  demodulating an analog radio signal to obtain a demodulated audio signal;
  determining a window of audio samples based on the demodulated audio signal;
  applying an audio enhancement network to the window of audio samples to obtain an enhanced audio segment, in which the audio enhancement network includes a machine learning network that has been trained using demodulated audio signals derived from analog radio signals to take the window of audio samples, in a pulse-code modulated format, as input and output the enhanced audio segment, in a pulse-code modulated format, such that power of an electromagnetic atmospheric noise present in the window of audio samples is reduced in the enhanced audio segment; and
  storing, playing, or transmitting an enhanced audio signal based on the enhanced audio segment.

12. The method of claim 11, comprising:
  demodulating a radio signal to obtain a training demodulated audio signal;
  receiving a streamed audio signal corresponding to the radio signal;
  determining a training window of audio samples based on the training demodulated audio signal;
  determining, based on the streamed audio signal, a ground truth window of audio samples corresponding to the training window of audio samples; and
  training the audio enhancement network using the training window of audio samples as a training input with feedback based on a loss function comparing a resulting enhanced audio segment to the ground truth window of audio samples.

13. The method of claim 12, in which determining, based on the streamed audio signal, the ground truth window of audio samples corresponding to the training window of audio samples comprises:
  determining cross-correlations between the training demodulated audio signal and the streamed audio signal; and
  resampling, based on the cross-correlations, the streamed audio signal to align samples of the ground truth window of audio samples with the training window of audio samples.

14. The method of claim 12, in which determining the training window of audio samples based on the training demodulated audio signal, and determining, based on the streamed audio signal, the ground truth window of audio samples corresponding to the training window of audio samples comprises:
  determining cross-correlations between the training demodulated audio signal and the streamed audio signal;
  based on the cross-correlations, identifying portions of the training demodulated audio signal and the streamed audio signal that are mismatched portions; and
  omitting samples based on the mismatched portions of the training demodulated audio signal and the streamed audio signal from the training window of audio samples and the ground truth window of audio samples respectively.

15. The method of claim 12, in which determining, based on the streamed audio signal, the ground truth window of audio samples corresponding to the training window of audio samples comprises:
  determining cross-correlations between the training demodulated audio signal and the streamed audio signal;
  based on the cross-correlations, determining a time shift between the training demodulated audio signal and the streamed audio signal; and applying the time shift to the streamed audio signal to align samples of the ground truth window of audio samples with the training window of audio samples.

16. The method of claim 11, comprising:
inputting the window of audio samples to a classifier to obtain a classification, in which the classifier includes a neural network and the classification takes a value from a set of multiple classes of audio; and
selecting, based on the classification, the audio enhancement network from a set of multiple audio enhancement networks, in which the audio enhancement network includes a neural network that has been trained using demodulated audio signals of a type associated with the classification.

17. The method of claim 16, in which the set of multiple classes of audio includes a speech class and a music class, and the set of multiple audio enhancement networks includes a speech enhancement network and a music enhancement network.

18. The method of claim 11, comprising:
determining a sequence of partially overlapping windows of audio samples, including the window of audio samples, based on the demodulated audio signal;
determining a sequence of respective enhanced audio segments, including the enhanced audio segment, based on the sequence of partially overlapping windows of audio samples using the audio enhancement network; and
determining an enhanced audio signal by blending the sequence of respective enhanced audio segments, including combining corresponding samples from multiple segments in overlapping portions of the enhanced audio segments.

19. The method of claim 11, in which the audio enhancement network includes a convolutional neural network.

20. A non-transitory computer-readable storage medium comprising executable instructions that, when executed by a processor, facilitate performance of operations comprising:
accessing a demodulated audio signal that is based on a demodulated analog radio signal;
determining a window of audio samples based on the demodulated audio signal;
applying an audio enhancement network to the window of audio samples to obtain an enhanced audio segment, in which the audio enhancement network includes a machine learning network that has been trained using demodulated audio signals derived from analog radio signals to take the window of audio samples, in a pulse-code modulated format, as input and output the enhanced audio segment, in a pulse-code modulated format, such that power of an electromagnetic atmospheric noise present in the window of audio samples is reduced in the enhanced audio segment; and
storing, playing, or transmitting an enhanced audio signal based on the enhanced audio segment.

21. The non-transitory computer-readable storage medium of claim 20, comprising executable instructions that, when executed by a processor, facilitate performance of operations comprising:
accessing a training demodulated audio signal that is based on a demodulated radio signal;
receiving a streamed audio signal corresponding to the radio signal;
determining a training window of audio samples based on the training demodulated audio signal;
determining, based on the streamed audio signal, a ground truth window of audio samples corresponding to the training window of audio samples; and
training the audio enhancement network using the training window of audio samples as a training input with feedback based on a loss function comparing a resulting enhanced audio segment to the ground truth window of audio samples.

22. The non-transitory computer-readable storage medium of claim 20, comprising executable instructions that, when executed by a processor, facilitate performance of operations comprising:
inputting the window of audio samples to a classifier to obtain a classification, in which the classifier includes a neural network and the classification takes a value from a set of multiple classes of audio; and
selecting, based on the classification, the audio enhancement network from a set of multiple audio enhancement networks, in which the audio enhancement network includes a neural network that has been trained using demodulated audio signals of a type associated with the classification.

* * * * *